US008200584B2

(12) United States Patent
Brickman, Jr.

(10) Patent No.: US 8,200,584 B2
(45) Date of Patent: Jun. 12, 2012

(54) EMPLOYEE RECRUITING SYSTEM AND METHOD

(76) Inventor: Carl E Brickman, Jr., Neptune Beach, FL (US)

( * ) Notice: Subject to any disclaimer, the term of this patent is extended or adjusted under 35 U.S.C. 154(b) by 2220 days.

(21) Appl. No.: 10/857,668

(22) Filed: May 28, 2004

(65) Prior Publication Data
US 2005/0060318 A1 Mar. 17, 2005

Related U.S. Application Data

(60) Provisional application No. 60/473,830, filed on May 28, 2003.

(51) Int. Cl.
*G06Q 10/00* (2006.01)
(52) U.S. Cl. ........................................................ 705/321
(58) Field of Classification Search ............... 705/1, 321
See application file for complete search history.

(56) References Cited

U.S. PATENT DOCUMENTS

| 2002/0002479 A1* | 1/2002 | Almog et al. | 705/8 |
| 2002/0069081 A1* | 6/2002 | Ingram et al. | 705/1 |
| 2003/0014294 A1* | 1/2003 | Yoneyama et al. | 705/8 |

OTHER PUBLICATIONS

Vault (www.vault.com) as archived on Feb. 2, 2001. pp. 1-4.*

* cited by examiner

*Primary Examiner* — Jamisue A Plucinski
(74) *Attorney, Agent, or Firm* — Mark Young

(57) ABSTRACT

A system for advertising an employment opportunity and efficiently providing information needed for a prospective employee to make a holistic assessment of the opportunity includes a job posting made accessible to potential candidates via a computer network or computer readable media. The job posting is comprised of a plurality of sections, with each section being devoted to one or more specific topics. The sections are accessible from an intuitive main menu. The sections provide an orderly arrangement of details concerning the employment position, significant co-workers, schools, housing, the community, nearby universities, an interview itinerary and links to local websites of interest, as well as views of residents (e.g., community leaders) concerning the community. The information may be presented in text, graphics, animation, audio and/or video formats. Other features include an email to a friend feature, a link to ask questions, a link for an application, and instructions and/or a link for submitting a resume. A network-accessible wizard automates creation of the posting.

19 Claims, 56 Drawing Sheets

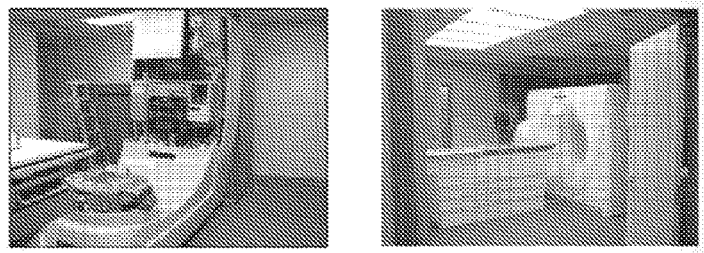

The Current Staff: 418
One Full-Time, Board-Certified Radiation Oncologist, Two Medical Oncologists, Two advanced-level Oncology RN's, Experienced Supervisor of Radiation Oncology, Director of Radiology, Dosimetrist, 2 Radiation Therapists and one part-time therapist.

Dr. Amtullah Khan, Tammy Bowman, and Robert Parker, Directors

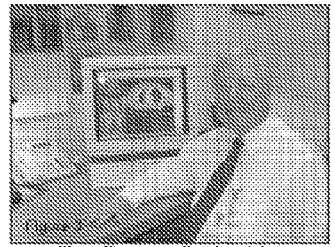

Tom Travers, Dosimetrist

 Click Here for a Photo Tour of the Cancer Center 

FIG. 4B

Compensation Package: 420

LCRH promises a competitive compensation based on the AAPM survey and current market conditions along with guaranteed minimum annual increases. Relocation, Vacation, CME, TBD. There is already an experienced physicist available for illness and vacation coverage. Long-Term Contract Position is possible, but not preferred.

Why This Position: 425

This is a career enhancing position set up for a significant "success story." LCRH is the only significant provider of cancer treatment services in the multi-county region. Physicists earlier in their careers will get tremendous experience in all facets of growing a new facility to "state-of-the-art" status, while more seasoned physicists will find this to be a stimulating position with autonomy and control. Enjoy a fine quality of life in a wonderful community with a low cost of living in a "lakefront" community that is "around the corner" from the culture and excitement of Nashville, Cincinnati, Knoxville, Louisville, Lexington, all less than 3 hours driving distance.

Two Ways to Evaluate the Position: 430

1. Base your evaluation of this opportunity on how the position (and thus your experience as a physicist) will have grown in 24-36 months, as virtually every feature of the department will be improved upon and grown to a "state-of-the-art" status—in your current position, will you obtain this kind of status and leadership experience while being fully supported by administration over this timeframe?
2. Lifestyle. Compare costs of housing, low cost of living features which may allow for aggressive retirement planning, the status you will enjoy as a "high income earner" in the county's largest and most prominent employer, the safety of the community, the "quality of life" with no traffic and geography, mild four seasons, recreation and leisure activities adjacent to the largest man-made lake in the eastern United States, and regional airport access to commuter flights to regional hubs.

Qualifications Necessary: 435

Board Certified Physicist with experience either setting up, or closely supporting the establishment of an IMRT treatment protocol. Experience with time studies, budgeting, prostate seed, strongly desired, understanding the need to mentor department on treatment planning, etc., is also necessary.

Interview Process: 440

HRF is the point of contact for this opportunity. Our Phone number is 888-409-4735.

*If you decide to be a candidate for the position, here is what will happen:*

After evaluation of your credentials, phone discussions will be arranged with key principals, and then the current physicist consultant who has key understanding of the department and it's goals and challenges. You will be mailed an information packet to

Chief Operating Officer Jeff Seraphine

"We are the premier provider of healthcare services in our region in a community that is modernizing, but with a small town charm that is safe for families. The airport will soon have access to a regional hub, and Lake Cumberland is a recreational attraction to thousands of vacationers and second-home owners, as well as retirees. We're a short drive to Nashville, Cincinnati, Louisville, and Knoxville in the Appalachian Mountains. Come and enjoy a challenging career with us in a community that is one of the best-kept secrets in the southeast."

Jeff enjoys spending time with his wife and three children. His favorite things about Somerset include a short commute to work with no traffic issues, the scenic outdoors, and the low cost of living.

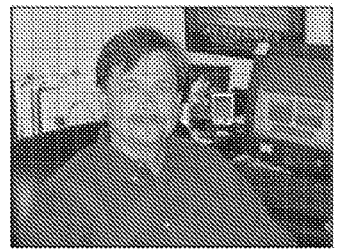

Chief Operating Officer John Pruitt

"I was raised in Phoenix, and I have lived and worked in different parts of the country including Dallas and Los Angeles. The people in our community are very friendly. If I were to describe living and working here versus other places I have been in my career, I would say Somerset is almost perfect."

John's career has led him to many places, but he enjoys Somerset most of all. John is married with three children, and his favorite activities include spending time with his family on Lake Cumberland, the Somernites Cruise and Car Show, and the Master Musician festival that is held on the Lake every summer.

FIG. 5B

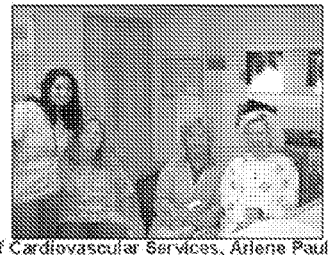

Coordinator of Cardiovascular Services, Arlene Pauli (third from left)

"The thing I like most about my job is taking care of our patients. This community is friendly, there's no crime, and I like the country setting. I like the pace of life here."

At LCRH for 17 years, Arlene is excited about the new Heart Center. Her department is growing, and her focus is on education and fostering a "team approach." Just by walking through her department you can see Arlene is respected and admired.

Cancer Center Principals

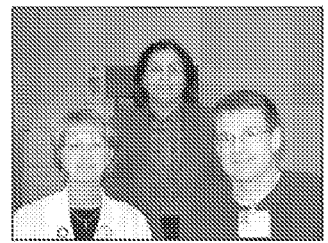

Amtullah Khan, MD, Radiation Oncologist (center)

Robert Parker, Director of Imaging Services

"The people of Somerset are friendly. It is very much a 'small town atmosphere' but with many choices and activities to develop terrific lifetime friends."

FIG. 5D

Robert has lived in Somerset for 12 years. He and his wife, after visiting Somerset and Lake Cumberland, decided it was the ideal place to raise a family, and he sought a position with LCRH. They have lived here ever since. His best memories of Somerset are the birth of his children here.

Tamara Bowman, Supervisor of Radiation Oncology

"The people here are kind and caring—they are truly 'neighborly.' I enjoy the events at The Center for Rural Development, from the shows, plays, and concerts, to the home shows."

Tammy supervises 13 employees and is excited about the new Cancer Center, which she is going to assist in managing. She has lived in Somerset for the past four years from Muncie, Indiana. Her parents have retired in Somerset.

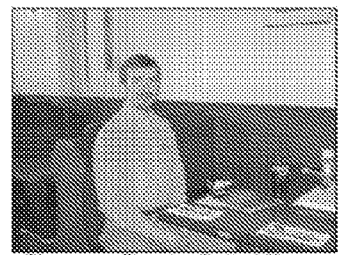

Pharmacy Director Robert Mayne

"This hospital has great interdepartmental relationships. I have worked at facilities where that wasn't the case. Also, being the biggest employer in town has its advantages—there is a certain amount of respect that goes along with working here. I didn't realize how much Somerset meant to me until I left to go to college. Being able to come back to live and work here has been great."

Overseeing 21 full-time employees and a 24 hour pharmacy that has expanded its clinical involvements and activities that are a result of input and ideas he encourages from his staff, his department is busy and a great place to work. Robert has been married for 13 years and has four boys. His favorite time of the year is the beginning of little league baseball season—it kicks off with a big parade and other festivities.

FIG. 5E

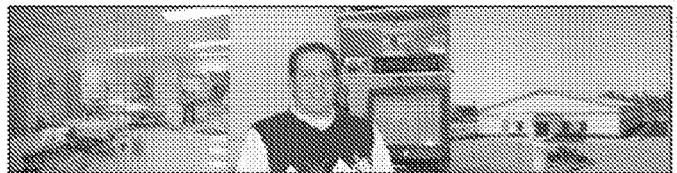

Director of LCRH Surgery Center Brandon Dugger

*"Somerset is a very family-friendly community. I have lived in larger cities, but you don't get the personal touch that you get in a community like this."*

Brandon has been at LCRH for four years and supervises 20 employees who see approximately 130 patients per week. Everyone is helpful, and each department is willing to help for the good of the team. Brandon's favorite time of the year is summer; he enjoys some of the finest golf in the state, and the many activities and community events that revolve around Lake Cumberland.

Director of Rehabilitation Services Steve House

*"My fondest memories of Somerset are mostly related to my children, from school plays, and academics, and athletic achievements of my children, like my son's first hit or my daughter's first soccer goal. I enjoy a 10 minute, seven mile commute to work instead of a 60 minute, 25 mile commute in my last position."*

With LRCH for 5 years, Steve oversees clinical/therapy aspects of acute care, 12 bed special care unit, 27 bed inpatient rehabilitation unit and 2 outpatient therapy departments. There are a total of 30 therapists at the center, and they plan to add three more physical therapists and 6 new clinical positions in the next year. He describes the people of Somerset as friendly, welcoming of newcomers, and many diverse cultural and religious backgrounds.

FIG. 5F and specialty fellowships at Harvard, Massachusetts General and University of Cincinnati). LCRH Neurological Unit has been consistently ranked ahead of Central Baptist, St. Joseph, Samaritan, and University of Kentucky hospitals in Lexington, and received Healthgrade's highest rating.

Dr. El-Kalliny had presided over the growth of the neurosurgery department from its beginning in 1990, which now has more than 15,000 patients from across the United States. He enjoys spending his time off with his wife and family. He has three sons, all who were raised in Pulaski County Schools; his oldest is a Biomedical Engineering major at Georgia Tech, the second is at University of Kentucky, and his youngest son attends elementary school in Somerset.

Zewdu Lissanu, MD (pictured on far right)
Board Certified, Hematology/Oncology

"Somerset is a small community, people know each other, and the society is very friendly. It is a good place to raise children. There is no traffic congestion of the big city where I lived before coming to Somerset. The community has a good medical group, which is diverse. I am excited the Hospital is opening a new state of the art Radiation Oncology Center which will add quality care to our patients."

Dr. Lissanu's residency was in New York City and Fellowship in Hematology/Oncology was at Georgetown University in Washington, DC. He has been practicing for 20 years and moved to Somerset three years ago from Northern Virginia.

FIG. 6C

Amtullah Khan, MD
Board-Certified Radiation Oncologist
Director of Cancer Center Services "As opposed to living and working in Chicago and other places I have lived, I can get to work quickly and easily. People are very friendly. Businesses are easily accessible. This is a great place for families with a very low crime rate."

Dr. Kahn is excited about the newly-constructed $8 million free-standing cancer center completed in 2004, which will be the premier provider of cancer treatment services in the region. Her favorite thing to do in Somerset is enjoy her houseboat on Lake Cumberland. Her husband is an entrepreneur, deals in real estate, and owns a restaurant.

FIG. 6D

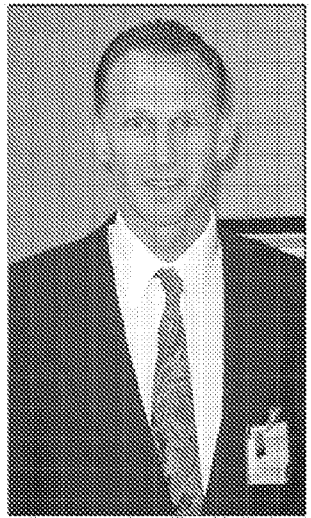

Greetings from Todd Wiltsie
Director of Physician Relations

"Many thanks for your interest in continuing your career with us at Lake Cumberland Regional Hospital in Somerset and Pulaski County. I relocated here from Cleveland, Ohio in 2002. The cost of living here is wonderful, this is a great community for children, and the patients are appreciative of the care they receive. The annual International Dinner hosted by the Rotary Club each spring is and indication of the welcoming spirit of our people, and our growing diversity. There is plenty to do here, the nature is spectacular and brings a sense of peace after work, and with the announcement of the expansion of our local airport to provide daily flights to regional hubs, we won't be 'the best kept secret' forever. Feel free to contact me any time with your questions, or additional information to supplement this interactive brochure."

Todd.Wiltsie@LPNT.net
606-678-3315

Back to top

FIG. 6E

Somerset and Pulaski County has enjoyed tremendous growth. 1240 jobs were created in the area in 2003 and another 1600 in 2004. The largest kitchen textile manufacturer in the US, CSI, has announced it is relocating to the community from California. An aluminum manufacturing plant (TDE, Inc.) and large manufacturer of corrugated boxes (Anderson Packaging) have moved to Somerset. There is a new 156 acre technology park outside of town adjacent to an industrial park. The local airport announced a $3.5 million expansion that will ultimately result in providing daily major airline jet flights. The Somerset Community is the central hub of a multi-county 300,000 population. (Website: http://www.spcdf.com/)

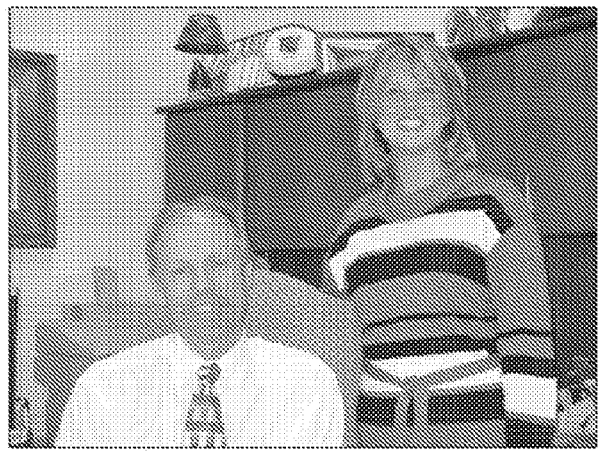

Lonnie Lawson, Executive Director,
The Center for Rural Development,
with assistant Amy

FIG. 7B

Lonnie oversees activities and cultural events at this convention center, which is the meeting place of the Somerset Community for concerts, fairs, trade shows, and art festivals. State-of-the-art meeting rooms and facilities with the latest technology is available for use and meetings for visiting companies on retreat at Lake Cumberland, as well as regional corporations for banquets and company gatherings. (Website: http://www.centertech.com/)

Click pictures for a closer view

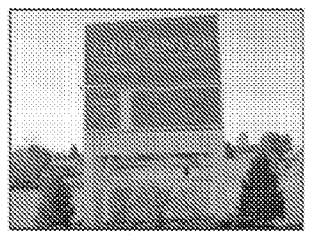
Marquee

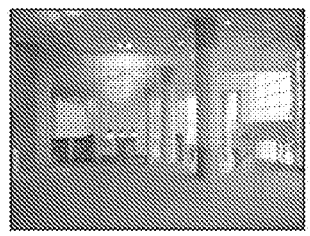
Lobby

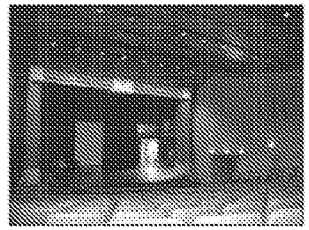
Theatre

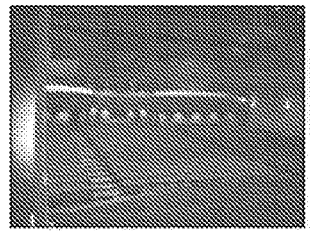
Theatre View from Stage

FIG. 7C

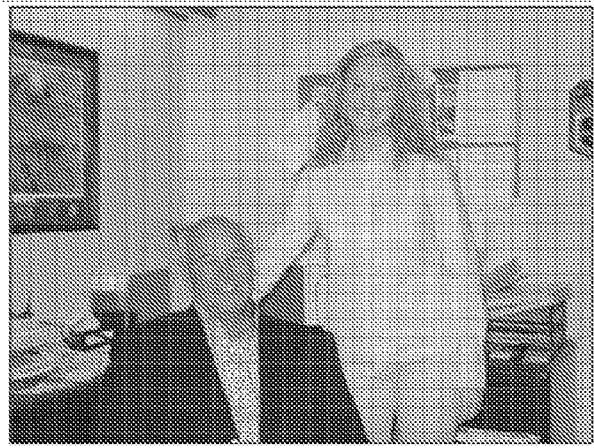

Jack Keeney, Executive Director of
Chamber of Commerce with assistant Linda

"Our community is large enough to serve you, and small enough to know you."

A 31 year resident of Somerset, Jack enjoys the many festivals and community events that surround the Lake. To anyone considering relocating to Somerset, he cheerfully invites you to "come on down—come play, and you'll stay!" (Website: http://www.spcchamber.com/)

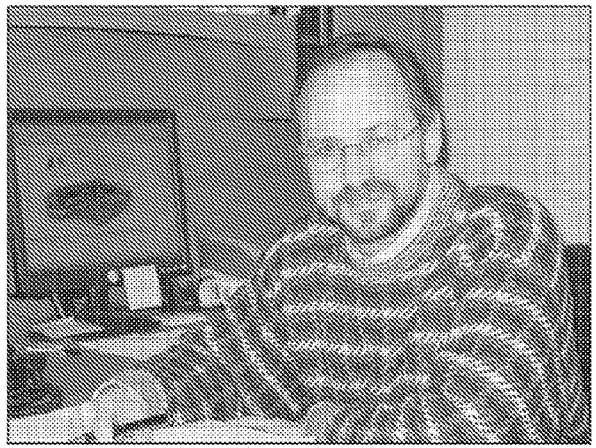

Joe Volpi, Administrator, Victory Christian School

FIG. 7E

"My most pleasant memories would have to be spending time with my family on the Lake."

Mr. Volpi is an eight-year resident of Somerset. Victory is an ICAA-accredited K-12 private Christian school. His four girls all attend. Victory Christian is growing and is constructing a new campus. (Website: http://www.somersetchristian.com/)

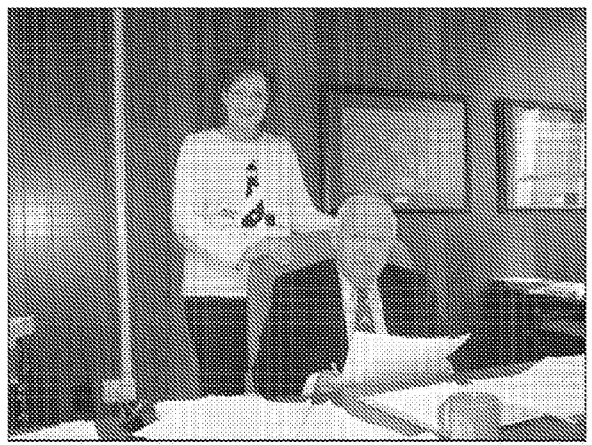

Superintendent Wilson Sears, Somerset Independent Schools

"Somerset is a great place to live and an excellent community to raise children. Summer nights, the Broadway Series by the Lake Cumberland Performing Arts, and the school support exists in all the schools here, are examples of the sense of community that exists here."

Mr. Sears came back to Somerset in 2000 after growing up here. His best memories are his childhood when he went to his high school and was a "Briar Jumper." (The school mascot is a rabbit and students call themselves "The Jumpers." (Website: http://www.somerset.k12.ky.us/)

FIG. 7F

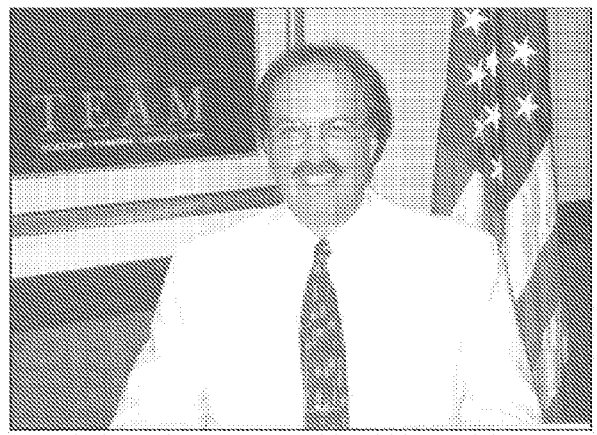

Tim Eaton, Superintendent of Pulaski County Schools

"Somerset gleans its charm from the people who instill a sense of belonging. They innovatively strive to improve the quality of life through cultural events and keeping the pace to stay abreast with important rural development issues. You will enjoy this safe, lovely community where good people live."

Tim has lived in Somerset for 46 years, and describes the people of Somerset as warm, caring, and welcoming. (Website: http://www.pulaski.k12.ky.us/schools/)

Libby Furlong, General Burnside State Park Manager, with Ranger Lisa Howard

FIG. 7G

"My favorite thing to do in the community is to enjoy the many recreational options at General Burnside State Park, the only island state park in Kentucky. The best time of year here is summertime to enjoy the beauty of the outdoors and many recreational options."

Libby is a 16 year resident in Burnside. Her husband is a Park Ranger and they have a 12 year old son. Their favorite events each year are Christmas Island, when the community places Christmas lights throughout the marinas that surround the park, and the Burnside Catfish festival.
(Website: http://www.state.ky.us/agencies/parks/genburns.htm)

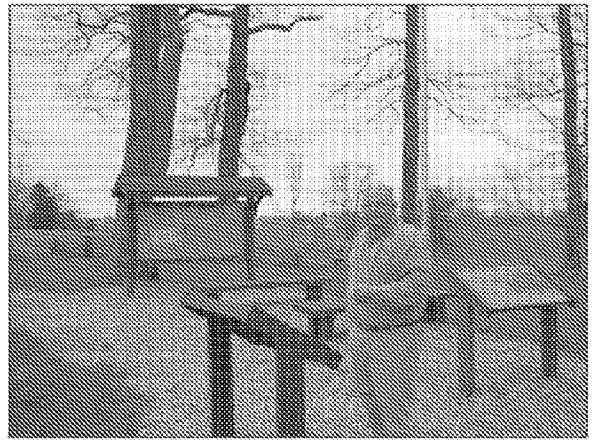

Bill Neikirk, President, Mill Springs Battlefield Association

On January 19, 1862, the first major battle in the Western theatre of the American Civil War took place right here in Somerset, a Union Victory. Over the last decade, Bill has played an instrumental role in growing this federally funded park, from fundraising, to excavations, to park management. Come by for a compelling tour and to learn about the unique history and circumstances behind this historical event. (Website: www.millsprings.net)

Bill owns an insurance company and lives with his wife Linda at Eagle's Nest Country Club, one of the premier golf clubs in southern Kentucky. Bill has twin sons and a daughter who is an attorney in Lexington, all raised in Pulaski County schools

FIG. 7H

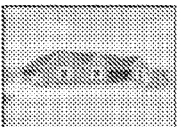
click for a closer view

Beautiful brick ranch home with full finished walkout basement in lake community features 4 Bedrooms, 3.5 Baths, 2 gas fireplaces, & beautiful crown moldings throughout. Airy open floor plan consisting of nearly 3500 finished sq.ft. includes huge master suite with garden tub, tile and laminate flooring, and lots of closet space, plus deep utility garage in basement for boat storage. $229,900.

click for a closer view 2-story 5 Bedroom, 4.5 Bath brick home in prestigious neighborhood includes over 4,000 sq.ft. Close to lake, full finished walkout basement with kitchenette and utility garage. 3 Gas fireplaces, gourmet kitchen, house also wired for security, lovely finish work throughout. Beautiful tiled and hardwood floors. Seasonal lakeview. $299,900.

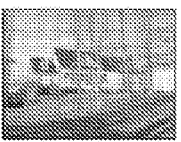
click for a closer view

This spacious 2-story home features a formal living and dining room, full unfinished walkout basement, large great room with fireplace and beautiful eat-in kitchen. 33' above-ground pool with extensive decking, all on extra large lot with shady mature trees, beautifully landscaped. Over 3,000 finished square footage. $279,900.

click for a closer view

Custom-built home with open formal living room with fireplace & formal dining room. Huge eat-in kitchen overlooking lake. 4 large bedrooms with a balcony overlooking living room, above-ground pool - lots of ceramic tile. Garages on main floor & in basement. Extra large family room with complete extra kitchen, bedroom, and utility garage in basement. Great subdivision - preferred schools. $369,000.

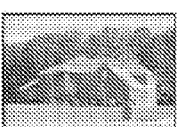
click for a closer view

Executive style home on 4+ acres in growing lake community features 5 bedrooms, 5 baths and over 4,000 sq. ft. with partial basement. Large rooms throughout, tastefully decorated, professionally designed, custom-built. Beautifully landscaping. Fabulous neighborhood and wonderful schools. $399,900.

FIG. 9B

Click here to read about the *Moonbow*
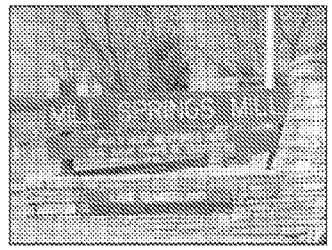
One of the largest "still-operating" waterfall-based mills in the country and a relaxing place to visit.
Website Click Here
 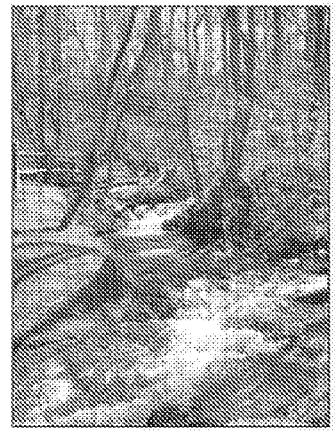
FIG. 9F

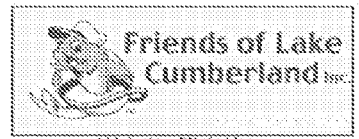
Friends of Lake Cumberland
Website Click Here
Businesses/Organizations: Website Click Here
Local Newspaper 925
Commonwealth Journal
Somerset-Kentucky.com
Website Click Here
930
Pulaski County Government
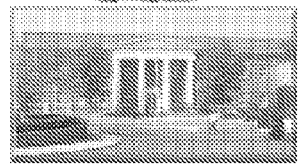
Website Click Here
FIG. 9G

Transylvania College, Lexington: http://www.transy.edu/
http://www.georgetowncollege.edu
http://www.cumberlandcollege.edu/
FIG. 8K
Back to top

Mark Bowles
Superintendent, Cape Girardeau Public Schools
10 year resident

1440

*"Cape Girardeau has a healthy blend of big city and small town. The population is so diverse as to defy description...I have found the people here to be very progressive and generous. This is a warm community that values education and has an outstanding school system as a result. With a full range of activities and facilities for kids, it is a wonderful place to raise a family."*

Chuck Martin,
Director, Cape Giradeau Visitor's Bureau
20 year resident

1450

*"One of the best things about Cape Girardeau is that you get to fully experience all four seasons. 'Cape' has wonderful people, a great park system, and is a community with a rich heritage with easy access to St. Louis, Memphis and Nashville. Our United Way raised $900,000 this year. Given the size of our community, I think that speaks volumes to the generosity of the people. If you are looking for a wonderful place to raise a family, then...we have the community for you!"*

Marsha Toll
PhD, Owner, Bellevue Bed & Breakfast Inn,
Riverfront District, 3 ½ year resident.

1460

*"Cape Girardeau is convenient and has a good mix of history with new stores, development, and the schools are good. The university provides cultural events. In autumn the trees are so pretty as they change, especially as you drive north and see the hills."*

1610
1620
Figure 16

Figure 18

MEDICAL PHYSICIST

Contact: HRF: 888 - 409 - 4735
Carl Brickman, Ext. 1

✉ Email This to a Friend

1210 Your Team Members
1220 Your Neighbors
1230 Schools, Housing and The Community
1240 The University
1250 Medical Physicist Position / Description
1260 Interview Itinerary
1270 Interesting Info and Links
1280 Return Home

Websites of Interest

| | |
|---|---|
| SEMO Hospital Website: | http://www.southeastmissourihospital.com/ |
| Cape Girardeau Visitors Bureau: | http://capegirardeaucvb.org |
| Schools: | http://www.capechamber.com/schools.htm |
| Cape Girardeau Public Schools: | http://www.cape.k12.mo.us/boehome.htm |
| Notre Dame Private Regional High School: | http://www.notredamehighschool.org |
| Cape Girardeau Newspaper: | http://www.semissourian.com/ |
| Chamber of Commerce: | http://www.capechamber.com/ |
| St. Louis Post Dispatch: | http://www.stltoday.com/ |
| Memphis Newspaper Commercial Appeal: | http://www.gomemphis.com |
| Nashville Tennesseean: | http://www.tennessean.com/ |

} 2010

Map/location/US:

Click here to view the Map

Statistics:
2002 Population Estimate: 35,653
26 City Parks (665 total acres)
Natural Areas: 266 (Wildlife Sanctuary of 160 miles)
City Plans in Effect:
River Campus-School of Visual and Performing Arts
Comprehensive Plan (Major Street, Future Use, Historic Preservation)
Airport Master Plan
Capital Improvements Program (2002-2007)
Drive Distances/Time:
St. Louis: Only 110 miles/under 2 hours.
Memphis: Just 165 miles/just over 2 ½ hours
Nashville: 210 miles/4 hours
Indianapolis: 300 miles/just over 5 hours
Additional Notes:
Missouri borders eight states.
Cape Girardeau natives have a slight southern accent and are very neighborly.
The streets of the River District are filled with the sound of children playing,
the boat horns and bells on the river, and particularly in spring and summer, bird calls.
Golf courses, Country Clubs, hunting, fishing are plentiful.
Both Memphis and St. Louis are extremely accessible although they seem far away.
Professional Sports: Football, Basketball, Hockey, are all withing 2 and a half hours.
Local Major Universities: SEMO State University, Southern Illinois University.
Under 2 hours to Fox Theatre, St. Louis Symphony Orchestra, 6 other major theatres,
Washington University and St. Louis University.
*Did you know ESPN Magazine recently rated St. Louis as the #1 Professional Sports town in America?*

EMPLOYEE RECRUITING SYSTEM AND METHOD

RELATED APPLICATIONS

This application claims priority to U.S. Provisional Application 60/473,830, filed May 28, 2003, the entire contents of which are hereby incorporated by reference herein.

COPYRIGHT NOTICE

A portion of the disclosure of this patent document contains material which is subject to copyright protection. The copyright owner has no objection to facsimile reproduction by anyone of the patent document or patent disclosure, as it appears in the Patent and Trademark Office patent file or records, but otherwise reserves all copyright rights whatsoever.

FIELD OF THE INVENTION

An embodiment of the invention relates generally to employee recruiting. More particularly, an embodiment of the invention relates to an improved system and method for creating a job posting that advertises an employment opportunity and efficiently providing information needed for a prospective employee to make a holistic assessment of the opportunity.

BACKGROUND

Employers and professional recruiters use a few approaches to attract employment candidates to fill available positions. Perhaps the most common approach is advertising in the employment section of a newspaper, on a website geared towards advertising employment opportunities, or in a magazine that is targeted to people having specific skills (e.g., engineers, attorneys, computer programmers, and so on). Other approaches include participating in job fairs and direct mail invitations arranged through industry trade organizations.

A conventional posting is a text-based advertisement that provides a brief description of the available position, along with an address, telephone number, facsimile number and/or e-mail address for applying. Occasionally, a posting will also include a brief statement about the company and one or more hyperlinks, such as a link to a company's web page. Typically, important details about the position and non-employment features of the opportunity are omitted. Thus, an applicant is often left to his or her own devices for gathering information about the company, its staff and the community, all of which are extremely relevant to suitability of the job. Applicants may apply for the advertised position by sending their resumes to the prospective employer or a recruiter by facsimile, regular mail or e-mail. An employer will usually have a person in its employment or human resources department screen the resumes to identify applicants qualified for the position.

An employer will usually have a person in its employment or human resources department screen the resumes to identify applicants that are best suited for the position. Candidates that pass initial screening may then be invited to telephonic and/or in-person interview. Often, the candidate-recruiter or candidate-employer relationship is impersonal and brief. Candidates are often ultimately forced to make substantial life-altering decisions based on a sketchy classified advertisement and one or two formal, brief and often hectic encounters with a prospective employer. Frequently, this approach results in interviewing ill-informed unqualified candidates, and an attendant waste of time and money.

Therefore, a continuing need exists for a system and method which will enhance the efficiency of recruiting efforts while providing prospective candidates with data needed to make an informed intelligent decision about a position, a company and its community. Early in the recruiting process, the system should efficiently present details about the position, employer, staff and community to reduce the risk of wasting time and resources on disinterested or unqualified candidates. The system should be easy to use. Additionally, the system should enable a candidate and employer to devote valuable interview time on important specific details, rather than background information and generalities. Furthermore the system should be suitable for use by an employer, recruiter, or a job-posting service provider (e.g., universities, professional organizations or career websites).

SUMMARY

An embodiment of the invention provides a system and method for advertising an employment opportunity and efficiently providing information needed for a prospective employee to make a holistic assessment of the opportunity. A job posting is made accessible to potential candidates via a computer network or computer readable media. The job posting is preferably comprised of a plurality of sections, with each section being devoted to a specific topic or topics. The sections are accessible from an intuitive main menu. In an exemplary embodiment, the sections provide an orderly arrangement of details concerning the employment position, significant co-workers, schools and nearby universities, housing, the community, an interview itinerary and links to local websites of interest, as well as views of residents (e.g., community leaders) concerning the community. The information may be presented in text, graphics, audio and/or video formats. Other features include an email to a friend feature, a link to ask questions, a link for an application, and instructions and/or a link for submitting a resume.

An object of an embodiment of the invention is to provide a system and method for enhancing the efficiency of recruiting efforts while providing prospective candidates with data needed to make an informed intelligent decision about a position, a company and its community.

Another object of an embodiment of the invention is to provide a system and method for, early in the recruiting process, efficiently presenting details about a position, employer, staff and community.

Yet another object of an embodiment of the invention is to provide an easy-to-use system and method for creating and publishing a job positing for creating and publishing a job posting and enhancing the efficiency of recruiting efforts.

Yet another object of an embodiment of the invention is to provide a system and method for enhancing the efficiency of recruiting efforts and enables a candidate and employer to devote valuable interview time on important specific details, rather than background information and generalities.

A further object of an embodiment of the invention is to provide a system and method for enhancing the efficiency of recruiting efforts for use by an employer, recruiter, or a job-posting service provider (e.g., universities, professional organizations or career websites).

Still a further object of an embodiment of the invention is to provide a system and method that includes a wizard-like tool for enabling efficient creation and publication of a job posting according to the invention.

Yet a further object of an embodiment of the invention is to provide a system and method for enhancing the efficiency of recruiting efforts that can be implemented on a conventional computer server accessible via a network such as the Internet.

DRAWINGS

These and other features, aspects and advantages of an embodiment of the invention will become better understood with reference to the following description, appended claims, and accompanying drawings, where:

FIG. 1 conceptually depicts a computer system for implementing a system and methodology in accordance with an exemplary implementation of an embodiment of the invention;

FIGS. 4A-4D show an exemplary position description page of a posting according to an exemplary embodiment of the invention;

Figure 5A:
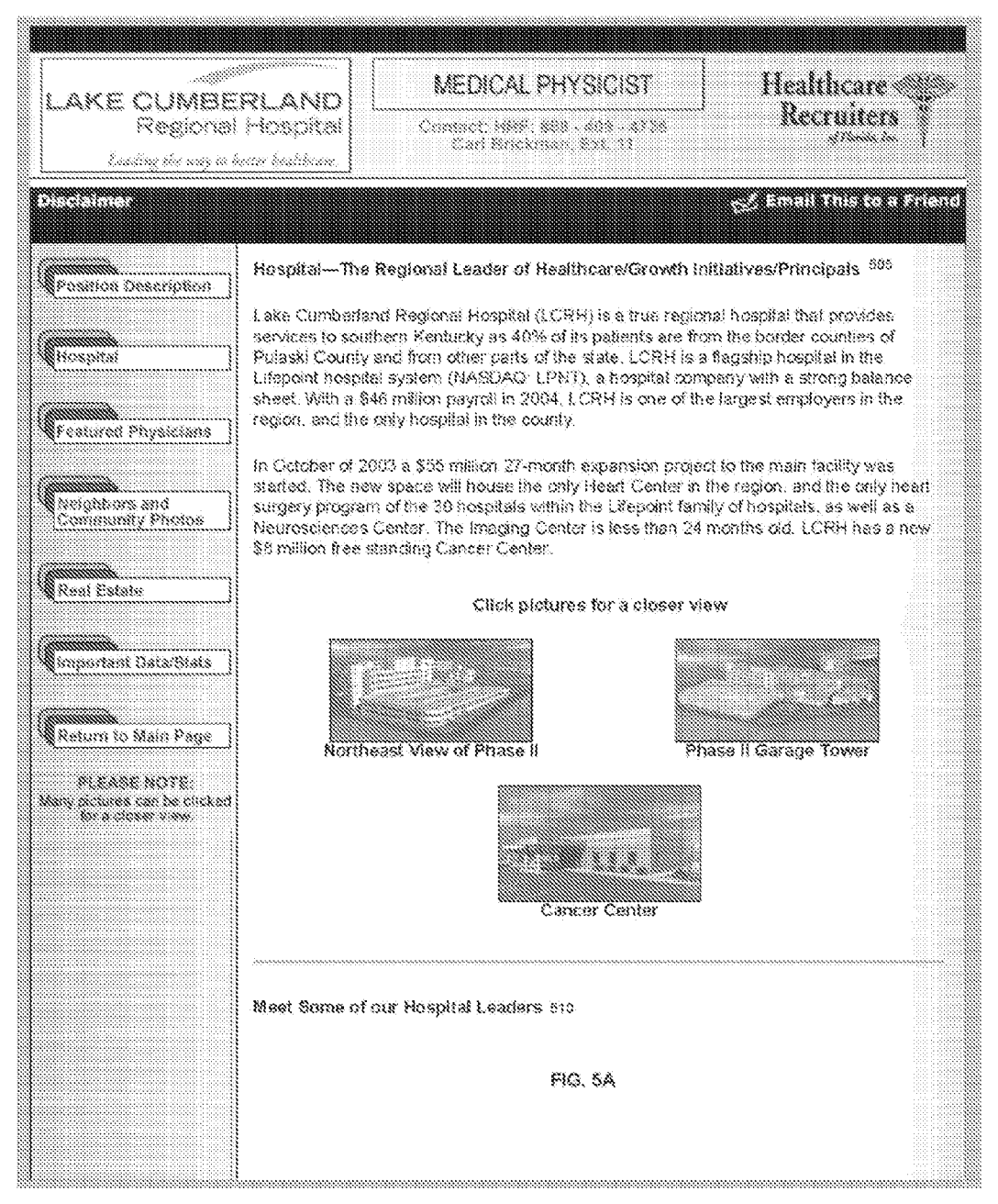

FIGS. 5A-5G show an exemplary facility description page of a posting according to an exemplary embodiment of the invention;

FIGS. 6A-6E show an exemplary featured personnel page of a posting according to an exemplary embodiment of the invention;

FIGS. 7A-7I show an exemplary neighbors and community page of a posting for use with an exemplary embodiment of the invention;

Figure 13A:
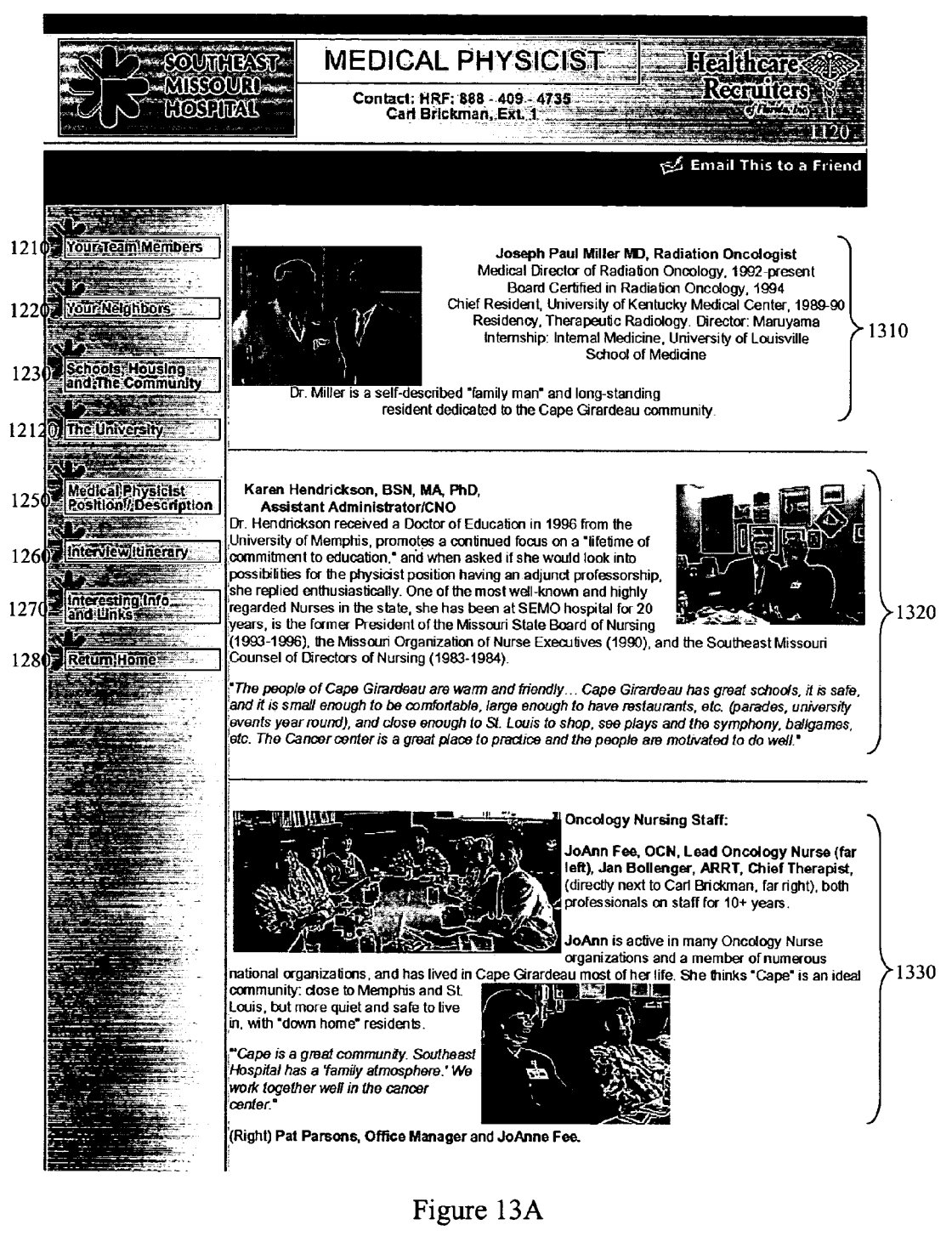
Figure 13B:
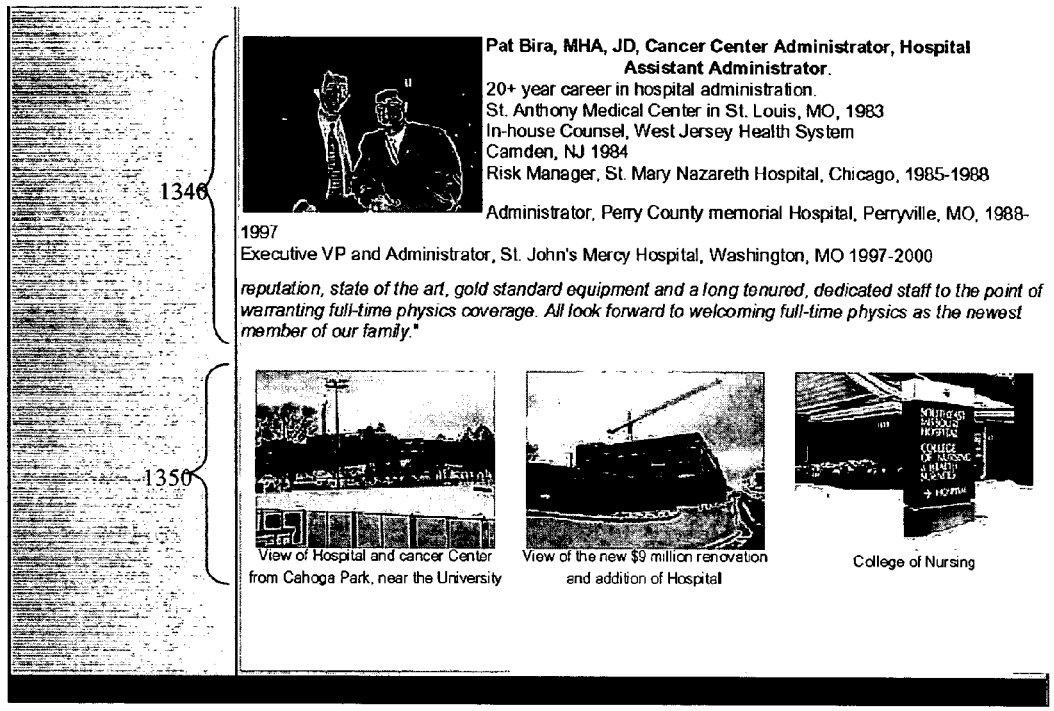
Figure 17:
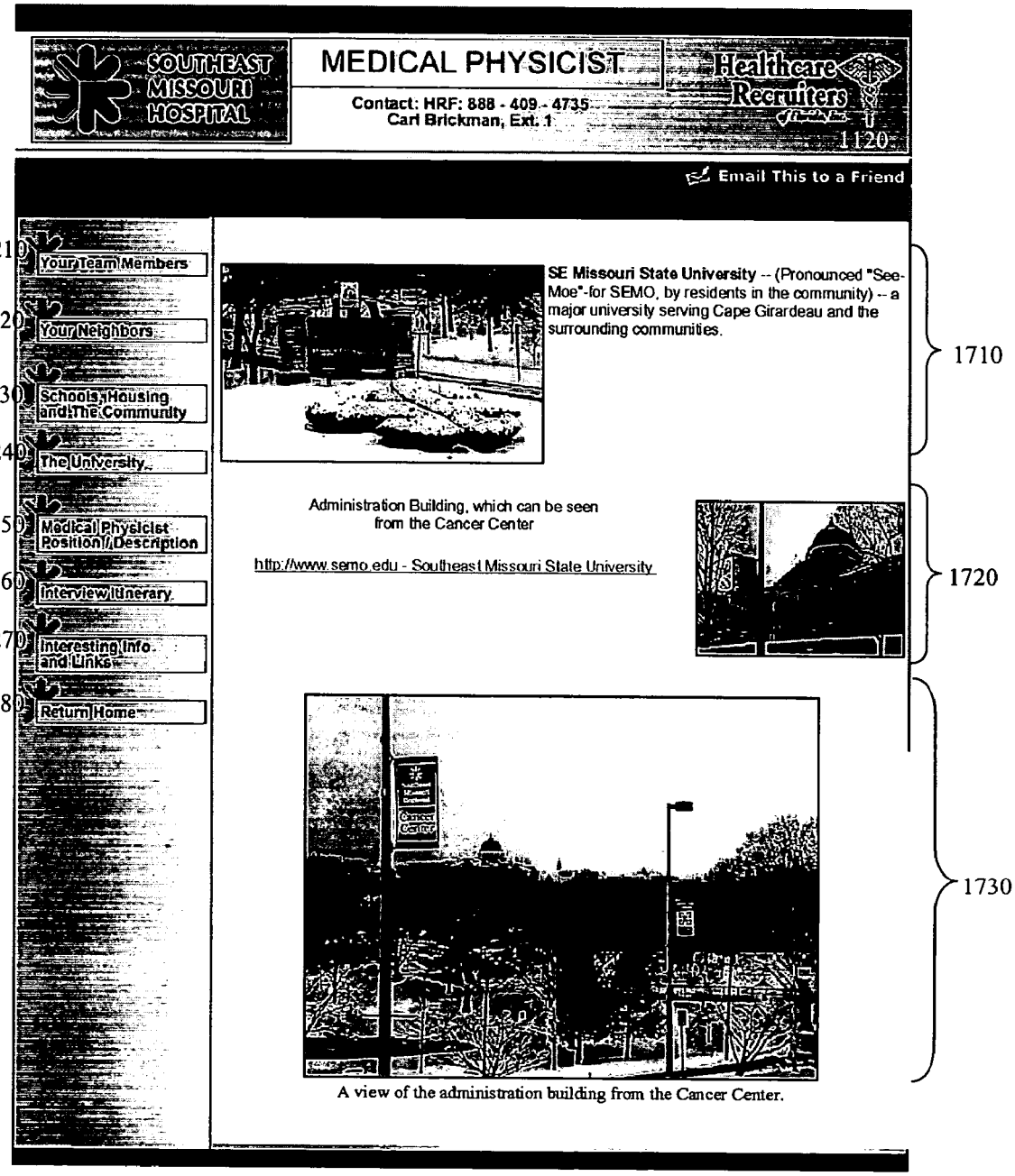
Figure 19:
Figure 21:
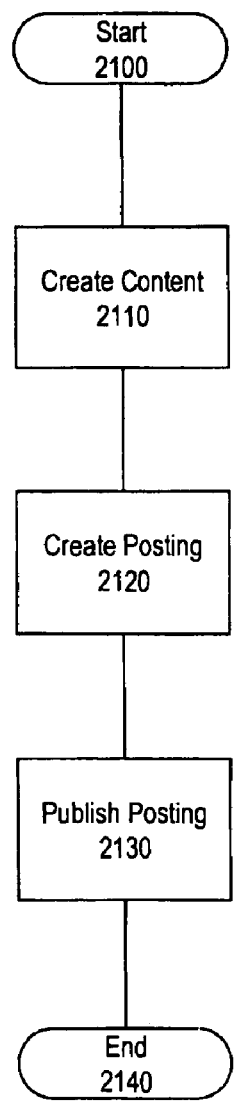

FIGS. 13A-B show an exemplary team member page in accordance with an exemplary embodiment of the invention;

Figure 14A:
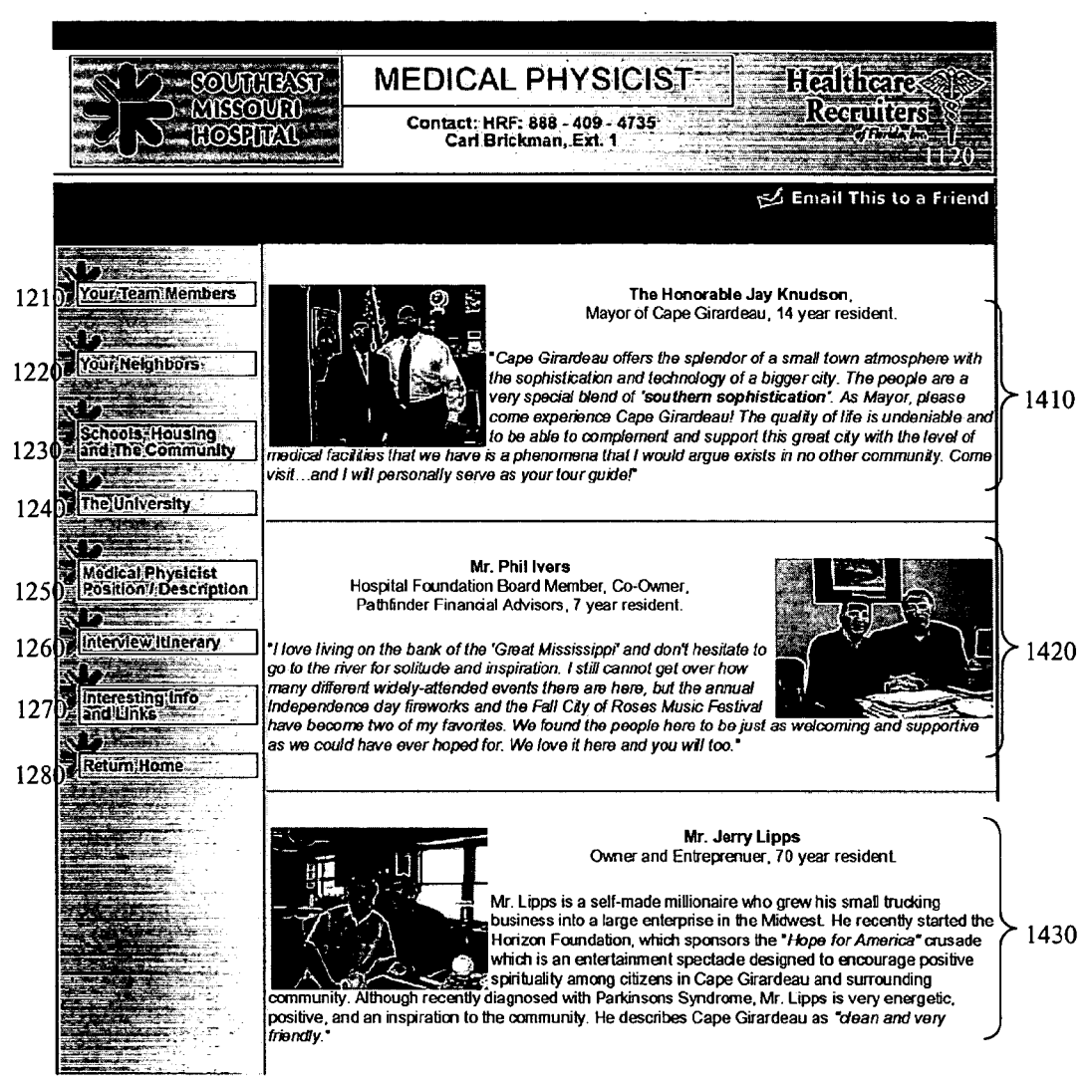

FIGS. 14A-B show an exemplary neighbors' (i.e., community residents) page in accordance with an exemplary embodiment of the invention;

Figure 15:
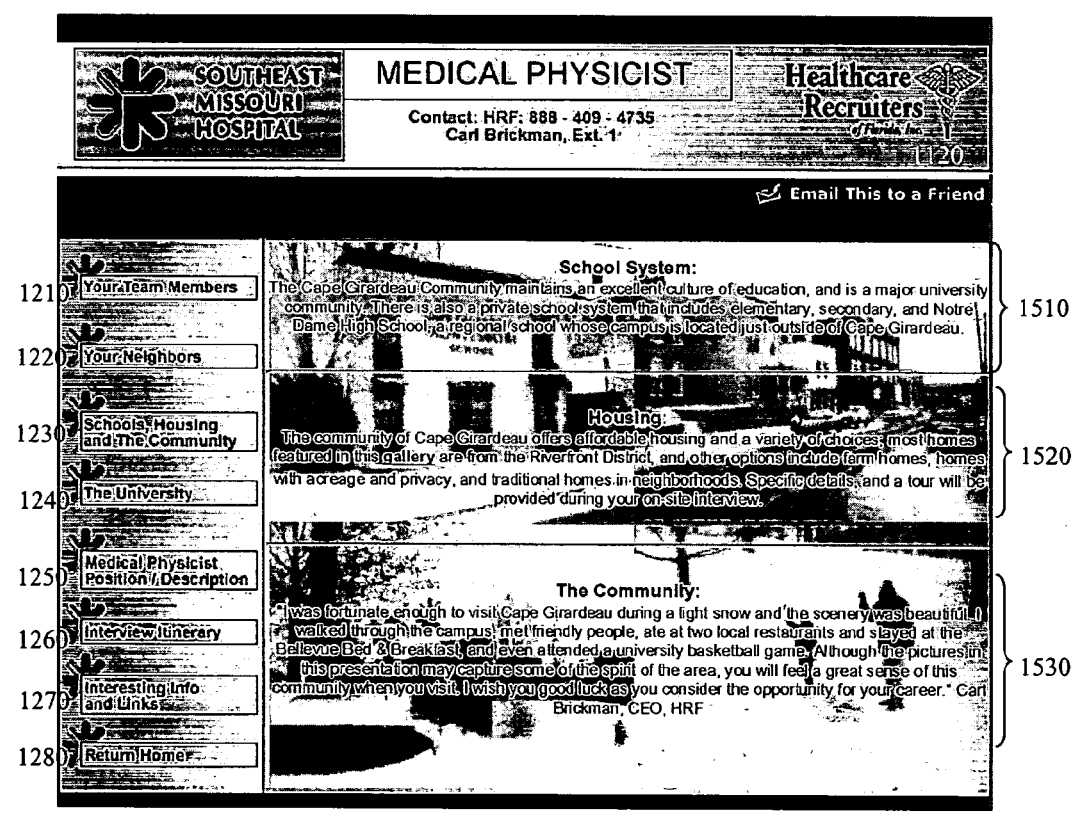

FIG. 15 shows an exemplary schools, housing and community page in accordance with an exemplary embodiment of the invention;

FIG. 16 shows exemplary houses within a community in accordance with an exemplary embodiment of the invention;

FIG. 17 shows an exemplary university page in accordance with an exemplary embodiment of the invention;

Figure 18:
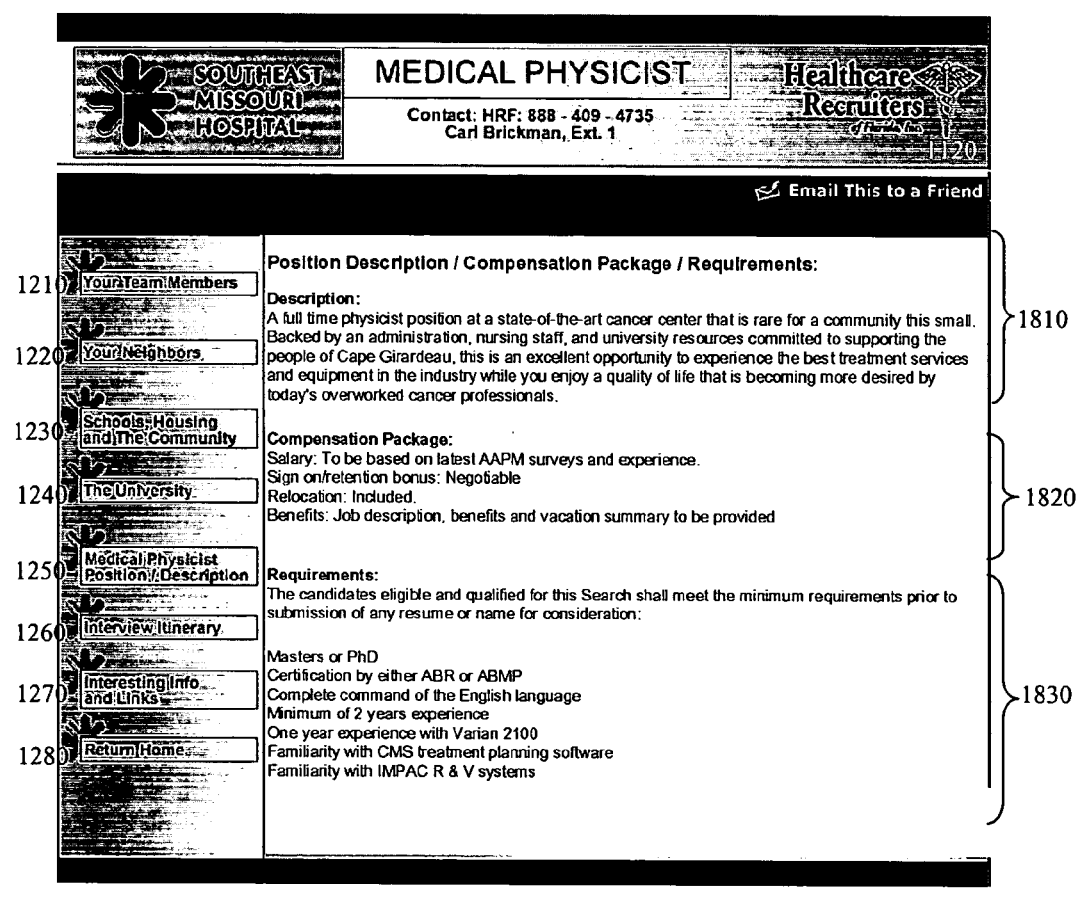

FIG. 18 shows an exemplary position description page in accordance with an exemplary embodiment of the invention;

FIG. 19 shows an exemplary interview itinerary page in accordance with an exemplary embodiment of the invention;

FIG. 20 shows an exemplary links/facts of interest page in accordance with an exemplary embodiment of the invention; and FIG. 21 is a flowchart conceptually depicting steps of a methodology advertising an employment opportunity and efficiently providing information needed for a prospective employee to make a holistic assessment of the opportunity in accordance with an exemplary implementation of an embodiment of the invention.

DETAILED DESCRIPTION

Figure 1:
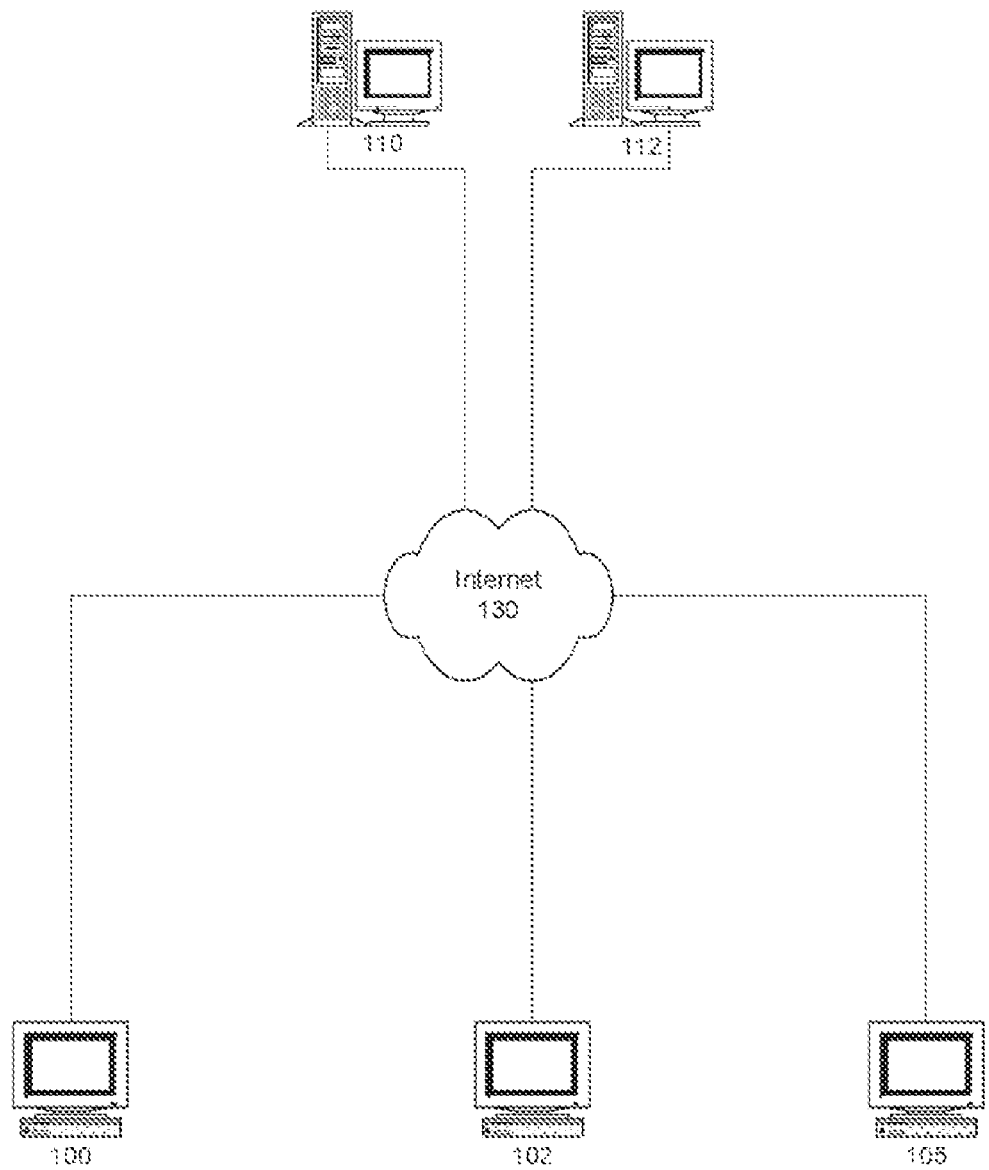

FIG. 1 conceptually illustrates an exemplary computer system and network for implementing a system and methodology for advertising an employment opportunity and efficiently providing information needed for a prospective employee in accordance with an exemplary implementation of an embodiment of the invention. Specifically, FIG. 1 shows at least one client computer 100, which may, for example, be used by a person searching for a position (i.e., a candidate), an employer or a recruiter. At least one server 110 (e.g., a web server 110) is provided at a remote location from the client computer. The server 110 may be maintained by a service provider, a recruiting firm, an employer or some other entity. The client computer 100 and server 110 are connected to one or more computer networks 130 (e.g., the Internet) which enable communication between the computers. The client computer 100 and server 110 preferably have suitable communications equipment and software so that they can communicate via the network 130. Of course, a plurality of candidates, employers and recruiters, using a plurality of client computers (e.g., computers 100, 102 and 105) may access one or more servers (e.g., 110 and 112) without departing from the scope of an embodiment of the invention.

Each client computer and server 100, 102, 105, 110 and 112 may include a bus for communicating information, a central processing unit (CPU), a read only memory (ROM), random access memory (RAM), a storage device, a communications device, a display and an input device. The storage device may include a hard disk, memory and/or other mass storage equipment. These elements are typically included in most computer systems, and the aforementioned computers are intended to represent a broad category of computer systems (e.g., servers, personal computers, personal digital assistants and the like) capable of being programmed for use with a methodology in accordance with an exemplary implementation of an embodiment of the invention. Of course, the system may include fewer, different and/or additional elements, provided it is capable of performing the method of advertising an employment opportunity and efficiently providing information needed for a prospective employee. For example, a computer may include multiple CPUs and various input and output devices. Additionally, a computer may stand alone or operate in a distributed environment to perform functions in accordance with an exemplary implementation of an embodiment of the invention.

The client computer 100 executes one or more computer programs under the control of an operating system. The computer programs and operating system perform several functions, including transmitting commands to a server computer 110 for performing various functions and receiving data from the server computer 110 in response to the commands. In an exemplary embodiment, the computer programs may include a browser, such as Microsoft Corporation's Internet Explorer™ or Netscape's Navigator™, although those skilled in the art will recognize that other programs could be used as well.

The server computer 110 also operates under the control of an operating system and executes one or more computer programs (e.g., a Web server or daemon) under the control of the operating system. These computer programs and the operating system perform several functions, including receiving commands from a client 100 for performing various functions and transmitting data to a client 100 in response to the commands.

In an exemplary embodiment, the system includes a series of interactive web pages that are stored on a server computer 110 and are accessible by users with client computers 100 via a network, which may include an intranet or the Internet, using conventional web page access means. By way of example, the interactive web pages may include HTML and XML code, JAVA, ASP Scripts, Microsoft Windows-based hosting solutions, and other scripting, coding, applications and the like that are suitable for use in web pages.

As used herein, the term "page" and the term "section" refer generally to a portion of a job posting in accordance with an exemplary embodiment of an embodiment of the invention. Each portion may comprise a single page, multiple pages, a part of a page, multiple parts of one or more pages, a window, a pop-up window, or some other identifiable portion of a job posting. The terms "job posting" and "posting" are used synonymously and refer to the combination of elements for providing information to a potential employee about an employment position. The elements may include text, graphics, objects, multimedia presentations, downloadable and/or streaming audio, and downloadable information.

In an exemplary embodiment, a posting provides an orderly arrangement of information needed for a prospective employee to make a holistic assessment of an opportunity. By way of example and not limitation, the information includes details concerning the employment position, significant co-workers, schools and nearby universities, housing, the community, an interview itinerary and links to local websites of interest, as well as views of residents (e.g., community leaders) concerning the community. The information may be presented in text, graphics, audio and/or video formats. Other features may include an email to a friend feature, a link to ask questions, a link for an application, and instructions and/or a link for submitting a resume. The specific content, titles, selection, arrangement and coordination of sections of a posting may vary considerably without departing from the scope of the invention, so long as the posting provides the information needed for a prospective employee to make a holistic assessment of an opportunity.

In a preferred arrangement, the information is presented in a manner geared towards the job opportunity. Much more than just a mere collection of links to other sites, the exemplary posting provides a structured framework of content specifically tailored for the opportunity. While links to other websites may also be included in an exemplary embodiment, they are included to supplement the tailored content provided in the posting.

Figure 2:
FIG. 2, shows an exemplary initialization screen of a posting in accordance with an exemplary implementation of an embodiment of the invention.

Referring now to FIG. 2, an exemplary initialization screen 200 of a posting for use with an exemplary implementation of an embodiment of the invention is conceptually shown. The initialization screen preferably provides information relevant to the position, such as images of the community. The screen may also include a multimedia presentation such as a vector graphics-based animation program (e.g., a Flash program authored with Macromedia's Flash authoring tools) to highlight features of the position. An icon 210 provides a hyperlink (i.e., a link) to a next page in the posting, which is shown in FIG. 3.

Figure 3:
FIG. 3 shows an exemplary introduction page of a posting in accordance with an exemplary implementation of an embodiment of the invention.
Figure 4A:
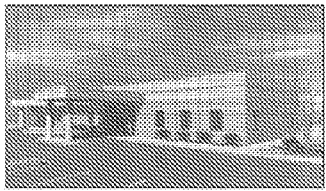
Figure 4D:
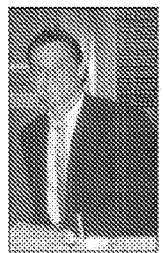
Figure 5C:
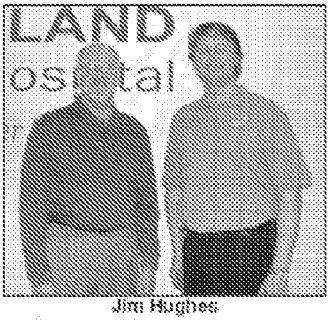
Figure 5G:
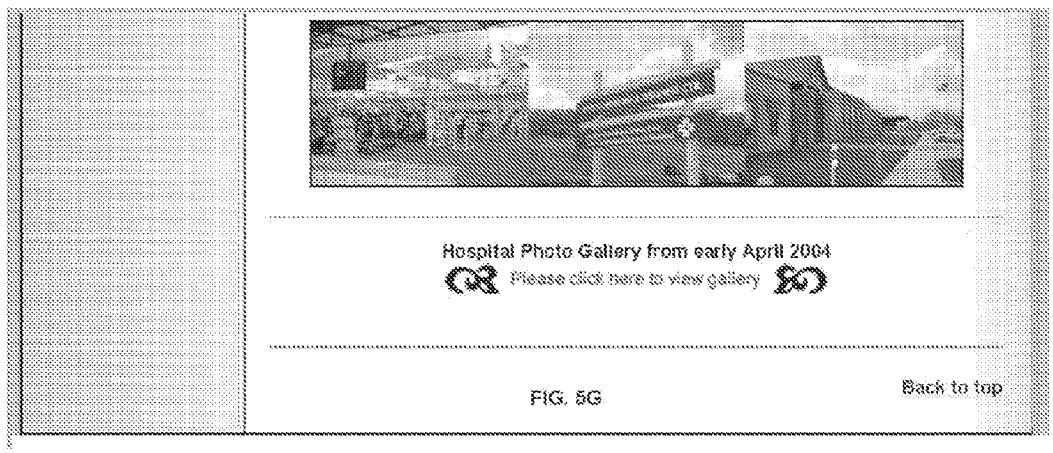
Figure 6A:
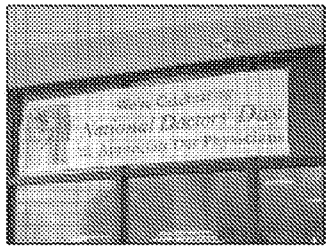
Figure 6B:
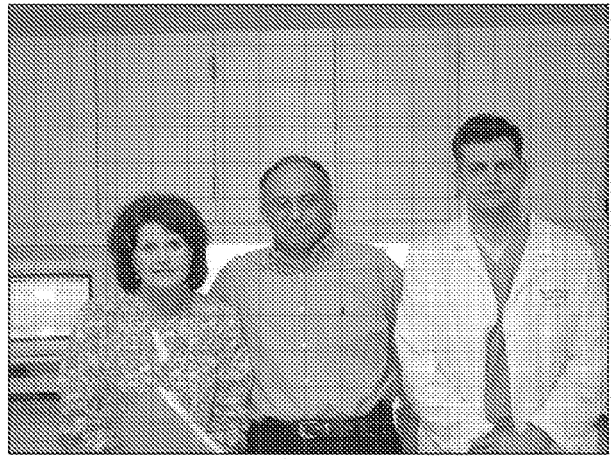
Figure 7A:
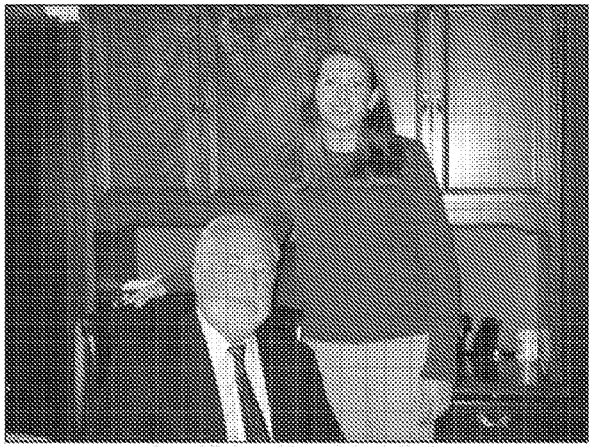
Figure 7D:
Figure 71:
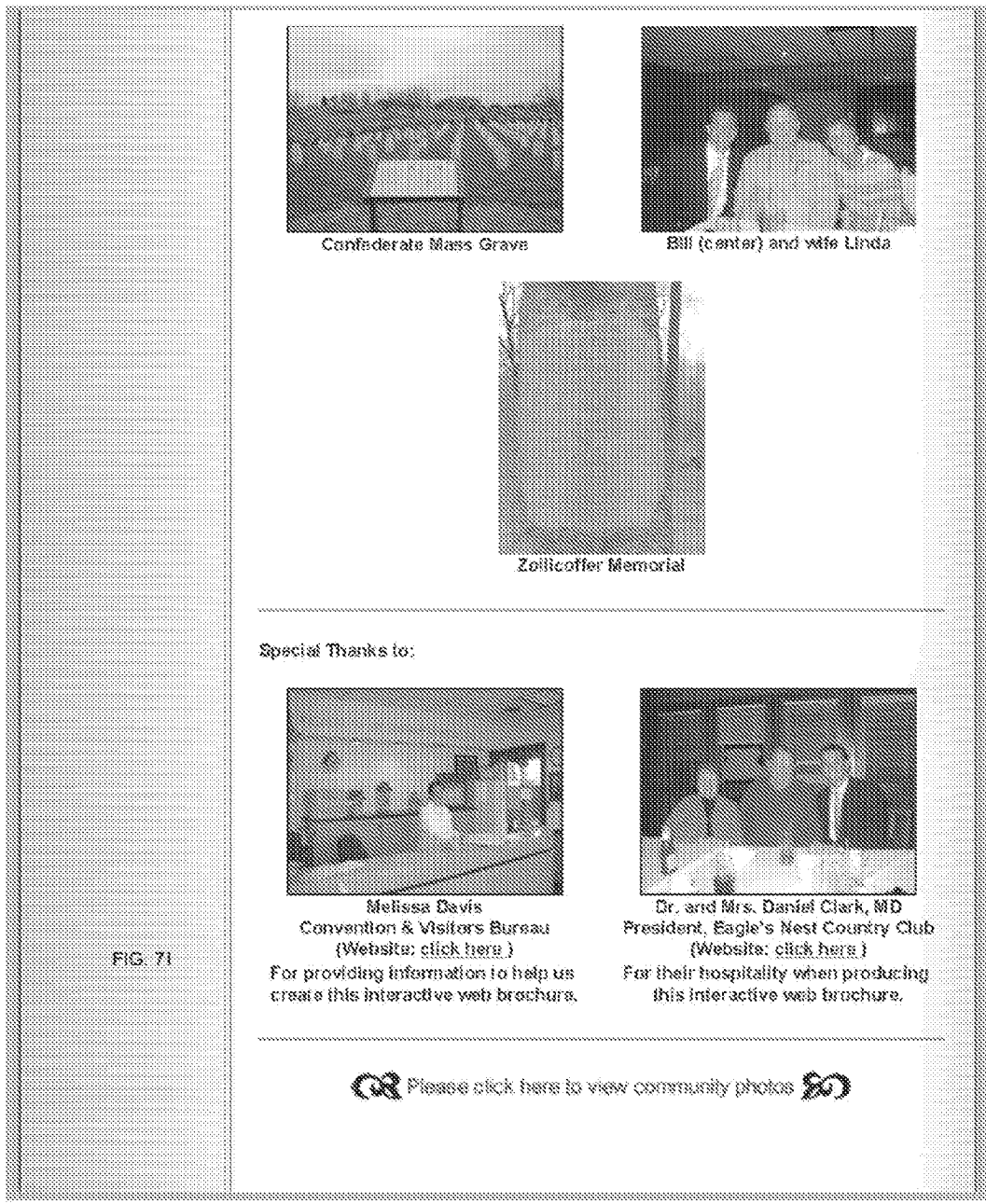

Referring now to FIG. 3 an introduction page 300 of a posting for use with an exemplary implementation of an embodiment of the invention is conceptually shown. The page preferably highlights key features of the opportunity 345. Preferably, a candidate will be able to determine if he or she is interested in the position from the introduction page.

Contact information is also provided, such as in a banner 350. The banner, which appears on many of the pages, is referred to herein as the banner 350. An email icon 320 enables a user to forward the page to an intended recipient in a conventional manner for emailing information from websites. Other icons 310-340 provide links to other sections of the posting. These icons 310-340 appear on many of the pages and are referred to herein collectively as the navigation menu 310-340.

Referring now to FIGS. 4A-4D a position description page of a posting according to an exemplary embodiment of the invention is provided. In addition to the navigation menu 310-340 and banner 350, the exemplary position description page provides a structured framework for presenting important information directly related to the position. An overview of the position section 405 of the page provides a high level description of the job. A department description section 410 provides details of the capabilities and resources of the relevant department. A current staff description 415 identifies key term members associated with the job and/or department. A compensation package section 420 describes the available compensation package. A "why this position" section 425 describes key features and advantages of the opportunity that may set it apart from other opportunities with other employers. An evaluation guideline section 430 suggests criteria that a prospective applicant should use to evaluate the position and compare it with other opportunities with other employers. A qualifications section 435 describes the requirements for the position, enabling a candidate to readily determine whether he or she may be a viable candidate. An interview process section 440 provides contact information and an overview of the steps for applying and interviewing.

Referring now to FIGS. 5A-5G a facility description page of a posting according to an exemplary embodiment of the invention is provided. In addition to the navigation menu 310-340 and banner 350, the exemplary facility description page provides a structured framework for presenting important information directly related to the facility. The information includes a description of the facility 505 and key personnel 510 for the facility, including photographs. Information concerning key personnel not only helps a candidate develop an understanding of the types of people with whom he or she may be working, but it also introduces key personnel who may be involved or met during the interview process. The personnel descriptions also help a candidate recall people met during the interview process. This section may include information concerning professional colleagues, as well as management and administrative staff.

Referring now to FIGS. 6A-6E a featured personnel page of a posting according to an exemplary embodiment of the invention is provided. In addition to the navigation menu 310-340 and banner 350, the exemplary featured personnel page provides a structured framework for identifying key personnel 510, including photographs, descriptions of areas of specialty and personal commentary. Again, this information not only helps a candidate develop an understanding of the types of people with whom he or she may be working, but it also introduces key professionals who may be involved or met during the interview process. The featured personnel descriptions also help a candidate recall people that may be met during the interview process.

Referring now to FIGS. 7A-7I, a neighbors and community page of a posting for use with an exemplary implementation of an embodiment of the invention is provided. In addition to the navigation menu 310-340 and banner 350, the exemplary neighbors and community page provides a structured framework for identifying community leaders and organizations. The page preferably introduces a candidate to community leaders who share their perspective of the community. The information preferably includes a photograph of each featured person and information about the community from that person's perspective. This information enables a candidate to familiarize himself or herself with people he or she may encounter while living in the community and to obtain various favorable perspectives about life in general in the community. The many unique perspectives from various walks of life help a candidate learn about the advantages of living in the featured community.

Figure 8A:
FIGS. 8A-8C show an exemplary real estate page of a posting for use with an exemplary embodiment of the invention.
Figure 8C:
Figure 9A:
FIGS. 9A-9K show an exemplary data and stats page of a posting for use with an exemplary embodiment of the invention.
Figure 9B:
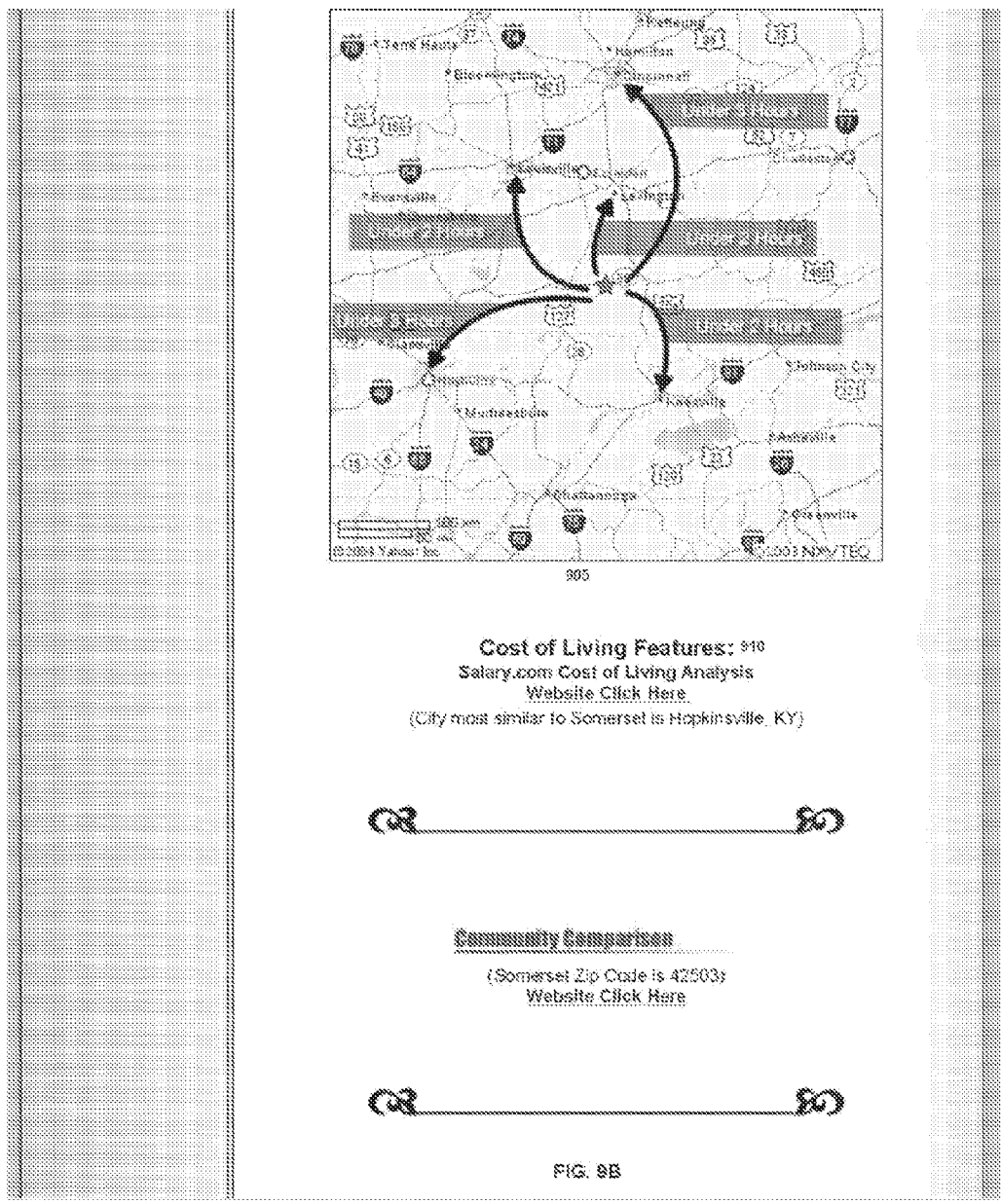
Figure 9C:
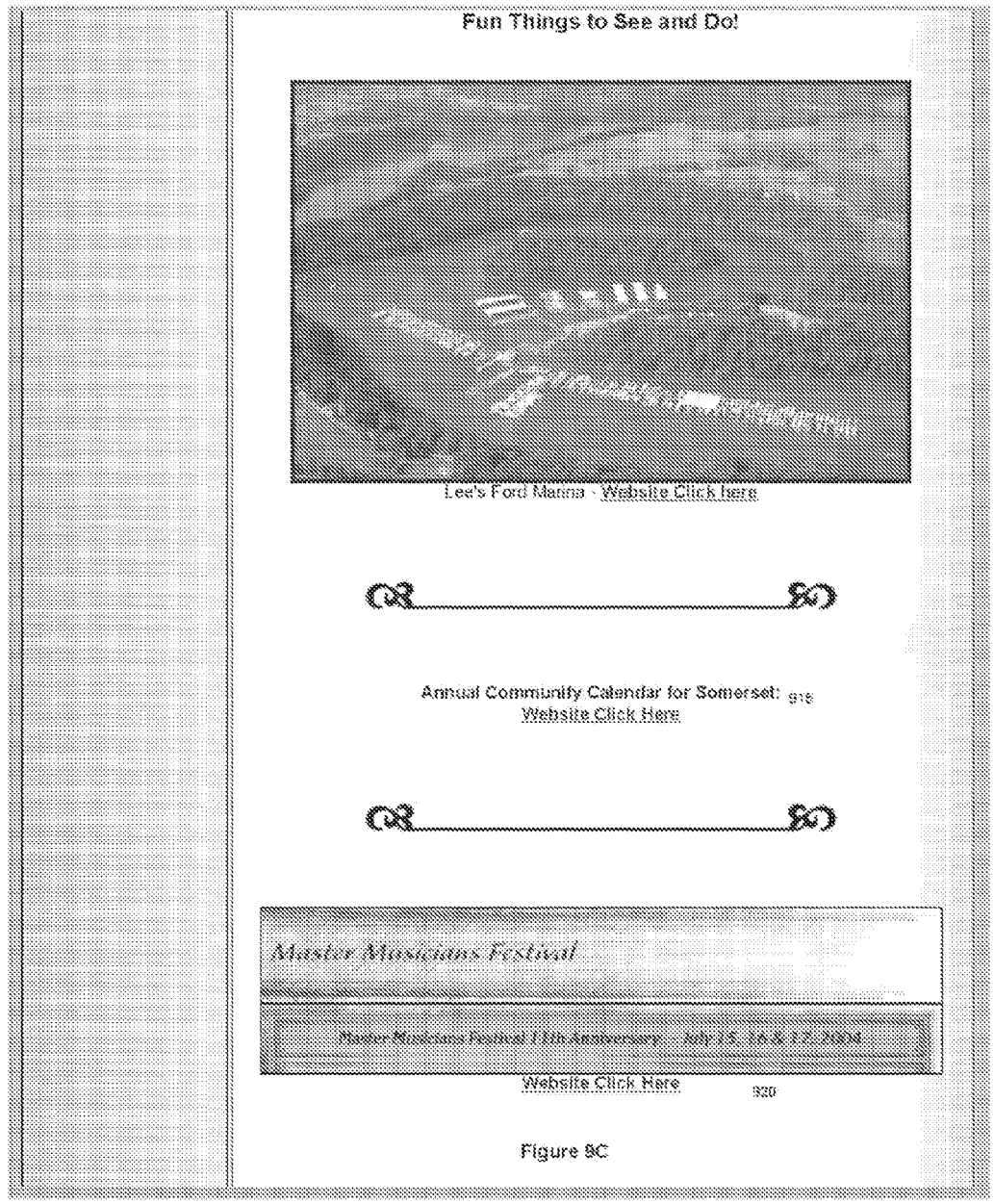
Figure 8D:
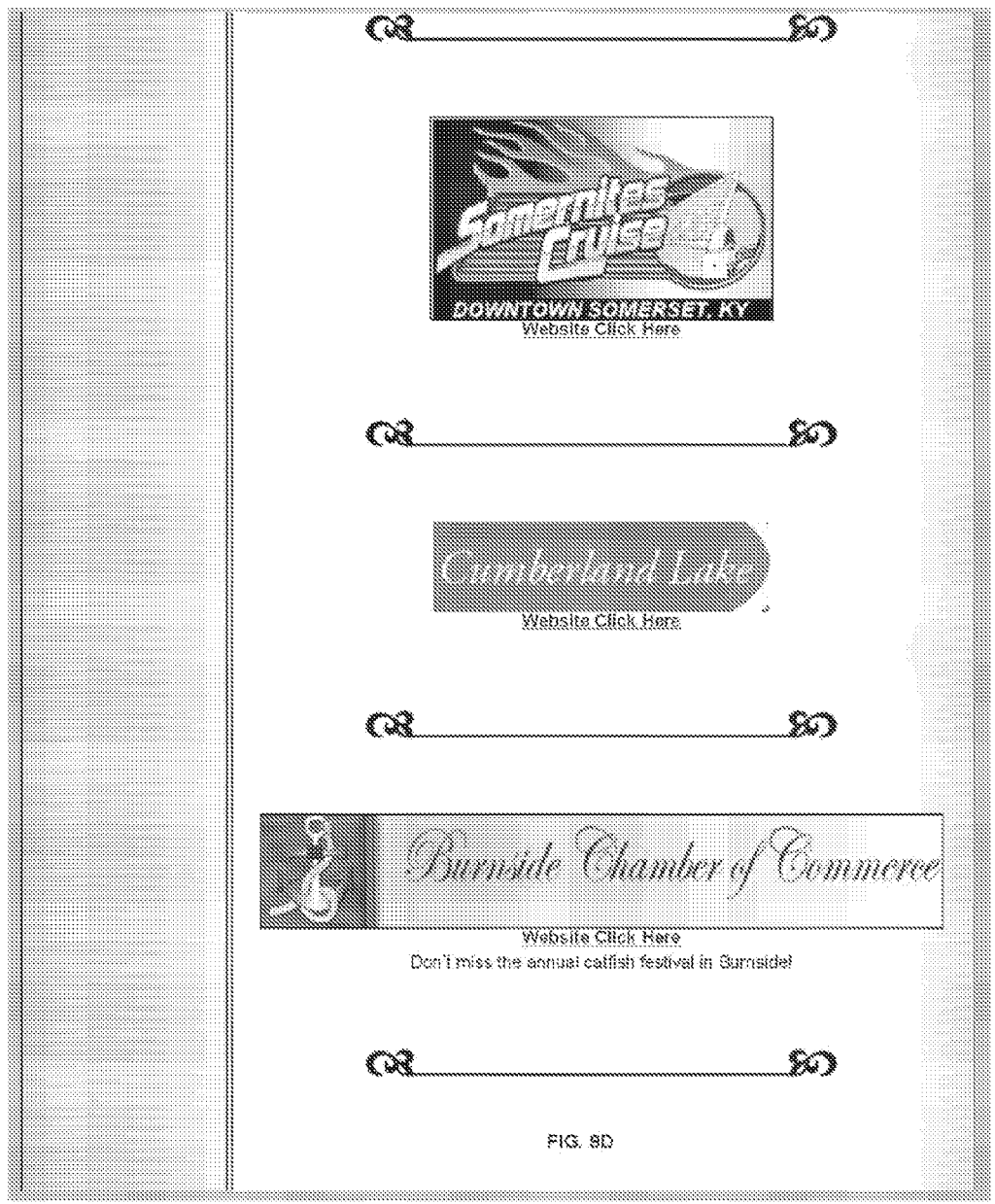
Figure 9E:
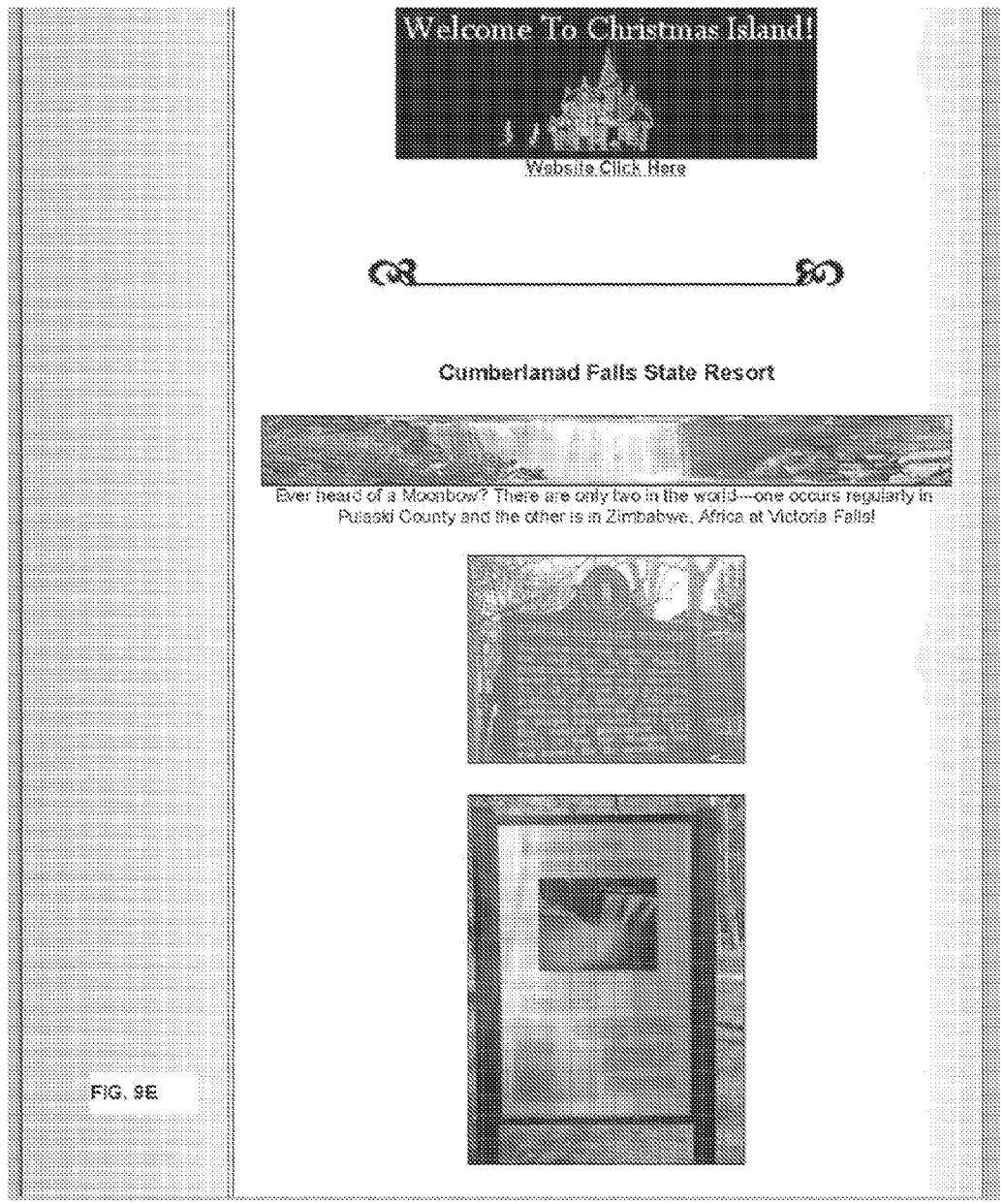
Figure 9H:
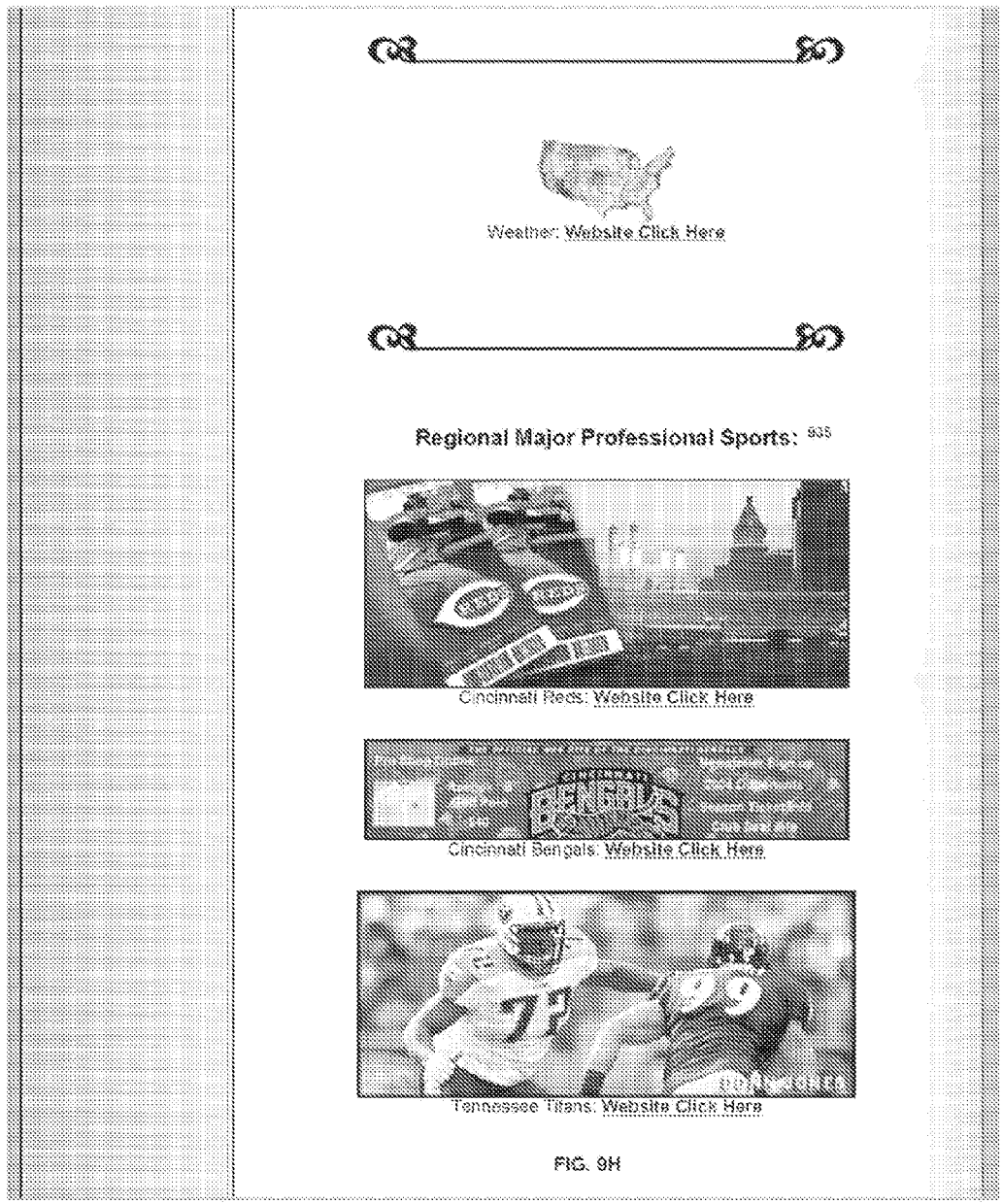
Figure 9L:
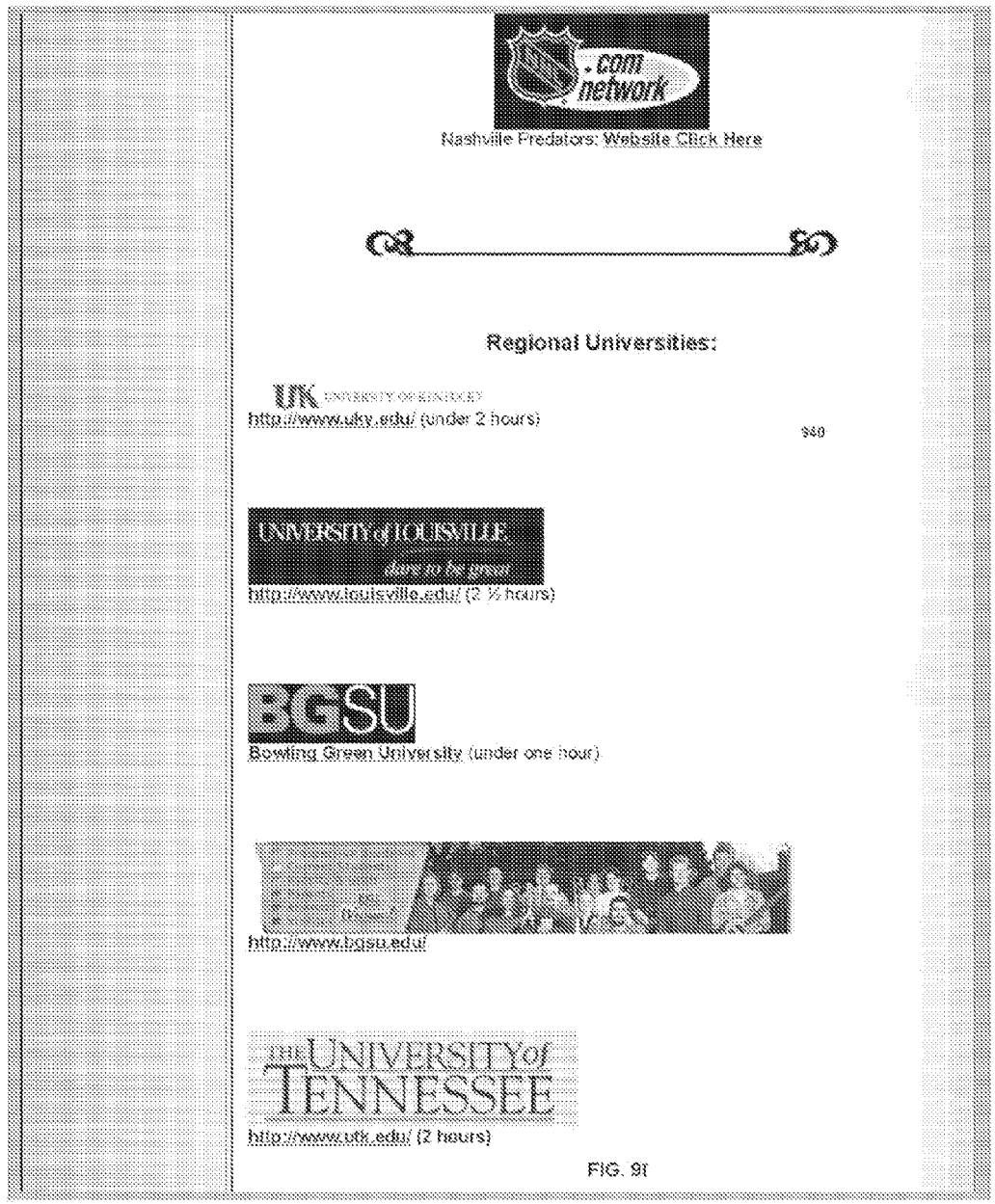
Figure 9J:
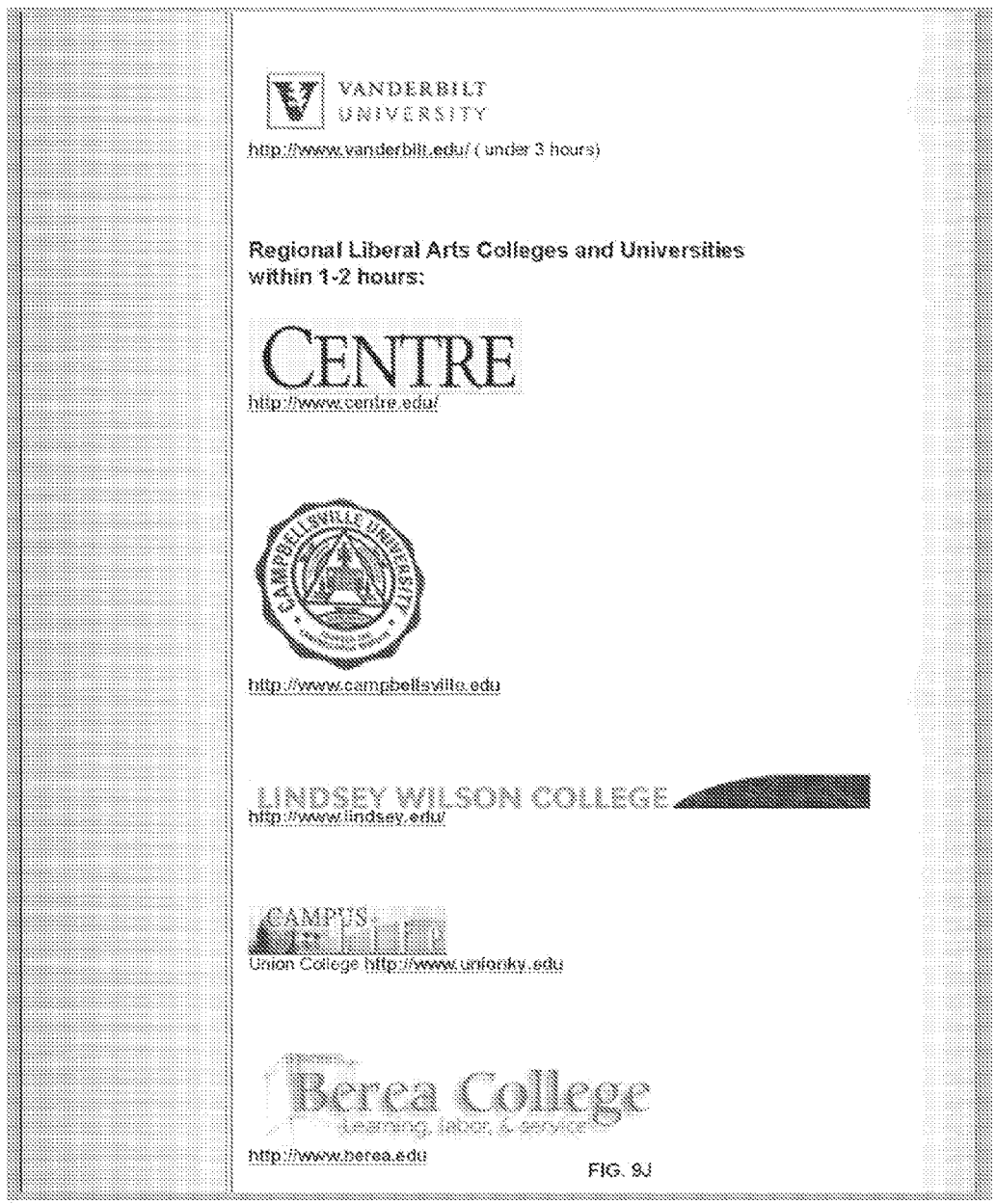

Referring now to FIGS. 8A-8C, a real estate page of a posting for use with an exemplary implementation of an embodiment of the invention is provided. In addition to the navigation menu 310-340 and banner 350, the exemplary real estate page provides listings for available properties over a wide range of prices. The page preferably introduces a candidate to the types and cost of available real estate in the vicinity. It may also include links to local real estate agents. This information enables a candidate to intelligently assess a key part of the cost of living and quality of life.

Referring now to FIGS. 9A-9K, a data and stats page of a posting for use with an exemplary implementation of an embodiment of the invention is provided. In addition to the navigation menu 310-340 and banner 350, the exemplary data and stats page provides a structured framework for providing important information about the community, attractions, events, local government and schools. Of course, any of these topics may be covered in another page without departing from the invention. Among the features of the exemplary page are a map 905, cost of living information 910, a community events calendar 915, links to events and attractions 920, a local newspaper link 925, a local government link 930, links for sports teams 935, and links for educational institutions 940. This information enables a candidate to familiarize himself or herself with life in the community and to identify local places, people and things of interest.

Referring now to FIGS. 10 to 20, another exemplary embodiment of a posting according to the principles of the invention is provided. Those skilled in the art will appreciate that many selection, arrangements and coordination of sections, content and information are feasible without departing from the scope of the invention.

Figure 10:
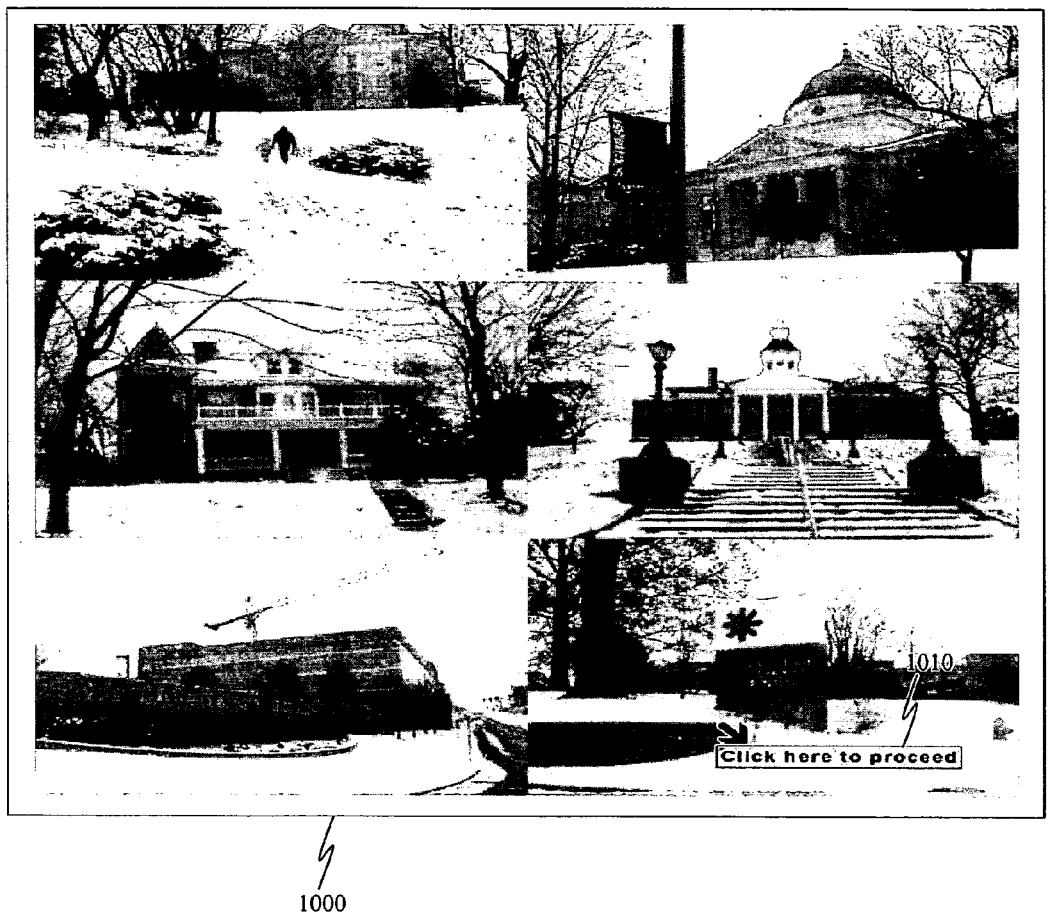
FIG. 10 shows an exemplary initialization screen in accordance with another exemplary embodiment of the invention.

In FIG. 10, an exemplary initialization screen 1000 of a posting for use with an exemplary implementation of the present invention is conceptually shown. The initialization screen preferably provides information relevant to the position, such as images of the community. The screen may also include a multimedia presentation such as a vector graphics-based animation program (e.g., a Flash program authored with Macromedia's Flash authoring tools) to highlight features of the position. An icon 1010 provides a hyperlink (i.e., a link) to a next page in the posting, which is shown in FIG. 10.

Figure 11:
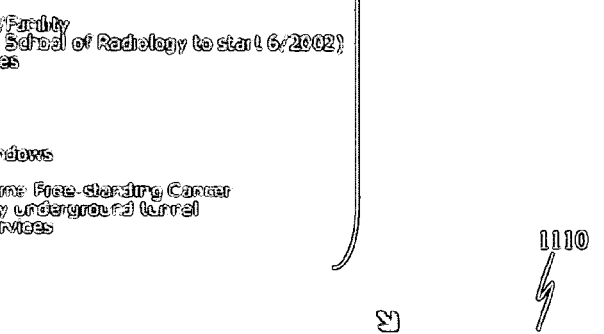
FIG. 11 shows an exemplary introduction page in accordance with an exemplary embodiment of the invention.

Referring now to FIG. 11 an introduction page 1100 of a posting for use with an exemplary implementation of the present invention is conceptually shown. The page preferably highlights key features of the position 1130. Preferably, a candidate will be able to determine if he or she is interested in the position from the introduction page. Contact information is also provided, such as in a banner 1120. An email icon enables a user to forward the page to an intended recipient in a conventional manner for emailing information from websites. Other icons 1110 and 1135 provide links to a next page or the home page (i.e., the initialization screen) in the posting, which are conceptually shown in FIGS. 12 and 10, respectively.

Figure 12:
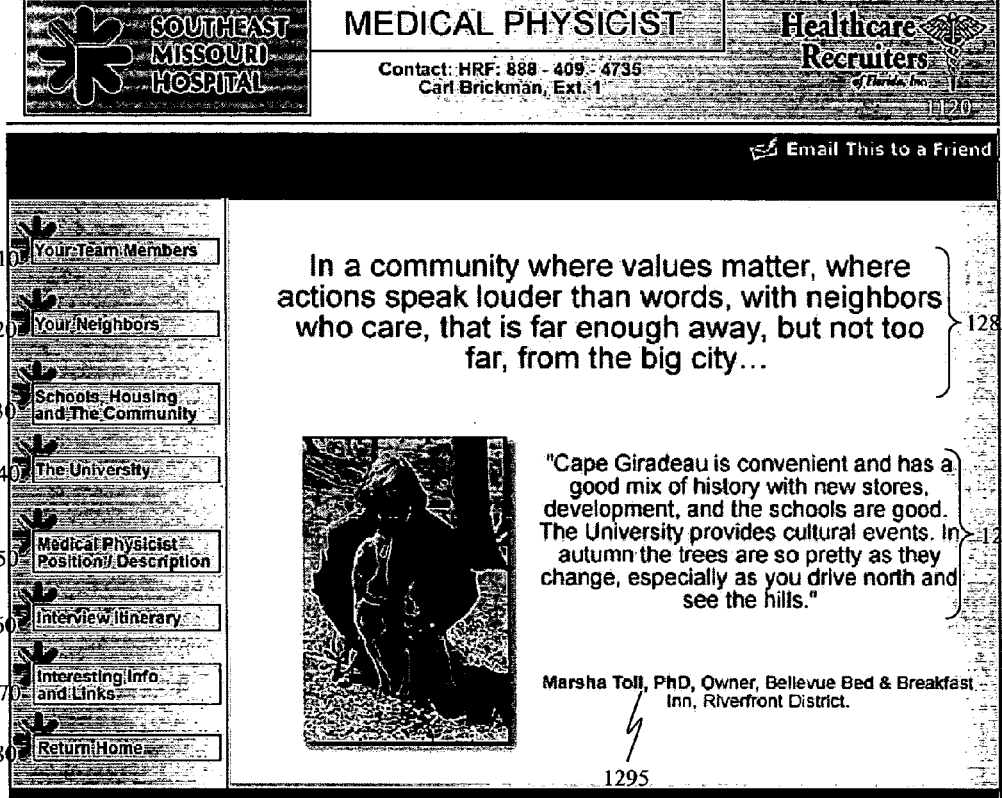
FIG. 12 shows an exemplary main menu page in accordance with an exemplary embodiment of the invention.

In FIG. 12 a main menu page 1200 of a posting for use with an exemplary implementation of an embodiment of the invention is conceptually shown. The page preferably provides a menu of links 1210-1280 to other pages (or other portions of page 1200) of the posting which provide information concerning the position and community. Introductory information may also be provided in the available space. By way of example, and not limitation, a thematic message 1285, a quote 1290 from a businesswoman 1295, and her photo are provided. Contact information is also provided, such as in the banner 1120.

Referring now to FIGS. 13A-13B, a team members page of a posting for use with an exemplary implementation of an embodiment of the invention is conceptually shown. The page preferably introduces a user to co-workers with whom the candidate will work if hired. Introductory information may include photographs of the team members, relevant biographical information, quotations, and the like 1310-1350. This information enables a candidate to familiarize himself or herself with people he or she may encounter during an interview and thereafter as a prospective co-worker.

Referring now to FIGS. 14A-14B, a neighbors page of a posting for use with an exemplary implementation of an embodiment of the invention is conceptually shown. The page preferably introduces a user to residents of the community, including community leaders, with whom the candidate may come into contact if he or she relocates to the community. The information preferably includes a photograph of each featured resident and information about the community from that resident's perspective 1410-1460. This information enables a candidate to familiarize himself or herself with people he or she may encounter while living in the community and to obtain various helpful perspectives about life in general in the community.

Referring now to FIG. 15, a schools, housing and community page of a posting for use with an exemplary implementation of an embodiment of the invention is conceptually shown. A general description of the public and private school systems is preferably provided 1510. Though not shown, links to schools or to contact information for schools may also be provided. A general description of the housing market is also preferably provided 1520 along with links to photographs of exemplary houses in the community, 1610-1620 in FIG. 16. Though not shown, links to local real estate brokers or to contact information for local real estate brokers may also be provided. A general statement about the community is also preferably provided 1530. This information enables a candidate to familiarize himself or herself with the schools and housing available in the community and to obtain another perspective about life in general in the community.

Referring now to FIG. 17, a university page of a posting for use with an exemplary implementation of an embodiment of the invention is conceptually shown. A general description and photographs of a local university are preferably provided 1710-1730. Descriptions and photographs may be provided for a plurality of universities. Links to university and university-related websites may also be provided. This information enables a candidate to familiarize himself or herself with the university or universities available in the community and to obtain another perspective about life in general in the community. Similar pages and/or sections may be supplied for other educational institutions, including high schools and elementary schools.

Referring now to FIG. 18, a position description of a posting for use with an exemplary implementation of an embodiment of the invention is conceptually shown. A precise description of the position, compensation package and requirements are preferably included 1810-1830. This information enables a candidate to reasonably assess whether he or she is qualified for the position, what the job would entail and the compensation associated with the job.

Referring now to FIG. 19, an interview itinerary 1910 for use with an exemplary implementation of an embodiment of the invention is conceptually shown. The itinerary preferably provides a description of the planned interview events, from arrival through departure, to provide a structured framework for the candidate and prospective employer. This information enables each participant to schedule for the interview, upon knowing a date or date(s). It also helps ensure that valuable interview time is carefully allocated and important aspects are not overlooked. For example, the exemplary itinerary allocates time for various tours. Links may be provided to a hotel where the candidate will stay, local sites of interest, and maps.

Referring now to FIG. 20, a page of links to websites of interest 2010 and relevant factual information 2020, such as maps, statistics and geographical information for use with an exemplary implementation of an embodiment of the invention is conceptually shown. The websites of interest 2010 may relate to topics addressed in any of the pages and/or additional topics of interest to a newcomer to the hiring company and community. The relevant factual information 2020 may help provide a geographical perspective and a perspective of the size of the community and local attractions. This information enables a candidate to better determine if the community is an acceptable size, in an acceptable location with features acceptable by the candidate. Other elements may include information and links to airports; state, county and local government information; and climate and seasonal weather. A link for submitting questions, a link for an application, and/or a link for submitting a resume may also be provided.

Upon reviewing the posting, a candidate will thus have enough information to reasonably determine whether the candidate is qualified for the employment opportunity, whether the employer and employment opportunity are suitable for the candidate, and whether the community is acceptable for the candidate. In sharp contrast, a conventional job posting may not even fully address any one of these key issues, consuming valuable interview time to address them later and risking oversight. A posting in accordance with an embodiment of the invention thus enables a candidate and prospective employer to focus on specific issues and concerns.

In an alternative implementation, a system in accordance with an embodiment of the invention may be comprised of a medium (such as a diskette or optical disk) upon which a posting is stored in a computer utilizable form (e.g., as an HTML document). The medium may be distributed to prospective candidates at tradeshows, conventions, meetings, via U.S. mail and/or other means of distribution. When reviewed on a computer having Internet access, links to websites would be fully enabled.

If a position becomes filled or the company is no longer interested in hiring a person for a posted position, an online posting can be deactivated by the employer or recruiter. A deactivated posting may be stored for access and use as a starting point by an employer or recruiter for future postings. Of course, the posting may also be activated and deactivated automatically based on determined information (e.g., dates during which the posting is to be active).

A link to a printer-friendly version of a posting may be provided. The printer-friendly version may enable printing or downloading of the entire posting with a single print or save command.

A website containing postings may include a "search" engine. A user may search postings to determine if a match exists between a posting and entered search information. The system may display a listing of the matching postings in response to a search. A user may then access a listing of search results to access postings of interest.

In an another exemplary implementation, a wizard, i.e., a program, applet or interface that leads a user through dialog steps, is provided to facilitate creation of a posting in accordance with the invention. An exemplary wizard, referred to herein as the Promo Web Professor, provides forms that solicit content (e.g., text, graphic images, URLs, etc.) and configuration settings for creating a posting. The Promo Web Professor may also provide detailed instructions and examples of entries to help clarify the type of information expected. The Promo Web Professor thus provides a step-by-step guide for creating an entire posting on the fly. From a web browser, an operator is able to access the Promo Web Professor to efficiently create a posting. Operator input is accepted into the web server 100 in response to the step-by-step procedure and a posting is created using the operator input. The Promo Web Professor may also be configured to upload the posting to one or more computer servers, based upon predetermined address information, or information specified by a user.

Thus, the Promo Web Professor frees a user from the need to tediously design each page and section of a posting. Furthermore, the Promo Web Professor obviates the need to learn and recall the structure of each page and section of a posting, and to understand web page design and hosting. The Promo Web Professor also helps ensure a consistent look and feel among related postings. When the dialog with an operator is completed, the Promo Web Professor populates a web page template with the content entered and settings made by the operator to create a posting. The Promo Web Professor may also facilitates publishing (i.e., making a web page accessible for Internet access).

Advantageously, the Promo Web Professor may be configured to offer certain default (e.g., suggested) content and configuration settings, which the operator may accept or override. The default content and configuration settings may be determined from information about the operator or from a prior posting by the operator. By way of example and not limitation, a system according to an exemplary implementation may require an operator to register and login. The registration process may require the operator to input information that can be used as default information for a posting. Default information may also be based upon the operator's locale. For example, information about local schools, real estate, local attractions and the local government, may be supplied from a data source, based upon a specified address or zip code. Additionally, information about a facility and its personnel may be based upon information previously entered by a user.

Importantly, the present invention provides a system and method for conveniently packaging information needed for a candidate to make an intelligent decision about a job. Advantageously, a candidate accessing a posting according to the invention does not have to visit other unrelated web pages using links which may be inactive. Such a candidate also does not have to sift through irrelevant information that is not specifically geared towards the job opportunity, or spend an inordinate amount of time to independently research the job, facilities, staff, community, schools and housing. Such information may be presented in an orderly manner using a posting according to an embodiment of the invention. Concomitantly, a Promo Web Professor and posting according to the invention provide powerful tools for an employer to create a posting that does not overlook important areas related to a job opportunity, emphasizes advantages of the opportunity, effectively promotes the job opportunity to candidates, and ensures that each candidate who views the posting has convenient access to the same relevant information about the opportunity. Consequently, a Promo Web Professor and posting according to the invention greatly enhance an employer's ability to consistently and effectively promote job opportunities while enabling candidates to efficiently evaluate an opportunity and make an informed decision.

Now referring to FIG. 21, a high-level flowchart of a methodology in accordance with an exemplary implementation of an embodiment of the invention is shown. An initial step of the methodology 2110 entails content creation. A project manager (e.g., a staff member or a contracted recruiter or service provider) may gather and/or create information, graphics, animation, presentations, documentation, video and audio for incorporation into the posting. The content will preferably address the topics identified above. The content should be assembled in a form that can be readily incorporated into the posting.

Another step 2120 entails creation of the posting. In an exemplary implementation, a posting will be comprised of Internet accessible web-pages. The web-pages may follow the format described above, or another format. Preferably, the posting will include an intuitive navigable arrangement of pages addressing the position, including responsibilities, requirements and compensation; the hiring employer, including its business and key staff members; and the community, including residents, housing, schools and universities, local attractions and nearby landmarks and attractions; and an interview itinerary.

The first and second steps, 2110 and 2120, respectively, may be performed in various orders or concurrently. For example, content may be gathered or created before or while the posting is created. Alternatively, the posting may first be created and the content inserted where intended when it becomes available.

A third step 2130 entails publishing the posting. Publishing makes the posting accessible to potential candidates, such as via an Internet website. Publishing is preferably accomplished in a conventional manner through a web server and/or by storage and distribution on computer-readable media such as a diskette or optical disk (e.g., CD-ROM or DVD). If published on the Internet, the posting may be published on the web pages of the employer, a recruiter or another service provider. By way of example and not limitation, such other service providers may include professional organizations, online classified advertisements, and online publications.

A wizard such as the Promo Web Professor may facilitate steps 2110-2130 of the methodology. Content may be derived from existing data. A posting may be automatically produced using entered content. The created posting may be uploaded to an address (i.e., published) as specified by a user.

The invention defined below by the enumerated claims may be better understood by referring to the above detailed description, which should be read in conjunction with the accompanying drawings. This detailed description of a particular preferred embodiment, set out above to enable one to practice the invention, is not intended to limit the enumerated claims, but to serve as a particular example thereof. Those skilled in the art should appreciate that they can readily use the concepts and specific implementations disclosed as a basis for modifying or designing other methods and systems for carrying out the same purposes of an embodiment of the invention. Those skilled in the art should also realize that such equivalent methods and systems do not depart from the spirit and scope of the invention in its broadest form.

I claim:

1. A computer-implemented web-based system for advertising and promoting career opportunities, said system including a server computer communicatively coupled to at least one other computer, said server computer including multimedia transmission means, and said server computer providing to said at least one other computer, a computer displayable holistic multimedia overview of the career opportunity and life in the business location so that a job seeker may make an informed decision, said holistic multimedia overview comprising a menu of a plurality of user-selectable sections, in viewing order, said sections presenting multimedia, including streaming video, graphics and text concerning a service area topic and a career topic, the service area topic including multimedia relating to a geographic service area for the career opportunity, local schools, local businesses and local lifestyle attractions, including recreation, entertainment and shopping attractions, and the career topic including multimedia relating to facilities, and streaming video, photographs and testimonials of professionals associated with the business and in the service area and interviews with said professionals said system further comprising a subsystem for creating a posting for a career opportunity, said subsystem including a computer-executable interactive module adapted to request input of multimedia for the job posting, said multimedia including content concerning a geographic service area for the career, photographs of and information about service area leaders and information about service area organizations, said interactive module being further adapted to create the job posting using inputted multimedia, said interactive module being further adapted for network access.

2. A system according to claim 1, said sections further presenting multimedia concerning a real estate topic, the real estate topic including multimedia relating to available housing in the geographic service area for the career opportunity.

3. A system according to claim 1, said sections further presenting multimedia concerning an interview itinerary, the interview itinerary including multimedia relating to a duration and anticipated schedule for interviewing, and the recruiting principals involved.

4. A system according to claim 1, said sections further presenting multimedia concerning a key personnel topic, the key personnel topic including multimedia relating to personnel relevant to the career opportunity.

5. A system according to claim 1, said sections further presenting multimedia concerning a facility topic, the facility topic including multimedia relating to the local economy.

6. A system according to claim 1, said multimedia including multimedia from the group consisting of textual, graphical, video and audio information.

7. A system according to claim 1, said system being adapted for access via Internet.

8. A system according to claim 1, said sections further presenting multimedia concerning:

a service area topic, the service area topic including multimedia relating to a geographic service area for the career opportunity and multiple lifestyle attractions including recreation, entertainment and shopping attractions, in the area;

an employer topic including multimedia relating to responsibilities, requirements and facilities related to the career opportunity;

a real estate topic, the real estate topic including multimedia relating to available housing in the geographic service area for the career opportunity;

an interview itinerary, the interview itinerary including information relating anticipated schedule for interviewing and recruiting professionals involved;

a key personnel topic, the key personnel topic including multimedia relating to personnel relevant to the career opportunity; and a facility topic, the facility topic including multimedia relating to a facility and equipment related to the career opportunity;

additional topics, including, economy, local businesses and local lifestyle attractions, including recreation, entertainment and shopping attractions, and persons related to these topics.

9. A system according to claim 8, said content including multimedia from the group consisting of textual, graphical, video and audio information.

10. A system according to claim 8, said system being adapted for access via the Internet.

11. A system according to claim 1, said information including content relating to available housing in the geographic service area for the career opportunity.

12. A system according to claim 1, said information including content relating to recruiting principals involved for the career.

13. A system according to claim 1, said information including content relating to personnel relevant to the career opportunity.

14. A system according to claim 1, said information including content relating to a facilities and equipment for the career.

15. A system according to claim 1, said content including information from the group consisting of textual, graphical, video and audio information.

16. A system according to claim 1, said information including content relating to available housing in the geographic service area for the career opportunity; and including content relating to the anticipated schedule for interviewing and principals involved.

17. A system according to claim 16, said information including content relating to personnel relevant to the career opportunity.

18. A system according to claim 17, said information including content relating to a facility and equipment related to the career opportunity.

19. A system according to claim 18, said content including information from the group consisting of textual, graphical, video and audio information.

* * * * *